US011897205B2

(12) United States Patent
Wucher et al.

(10) Patent No.: US 11,897,205 B2
(45) Date of Patent: Feb. 13, 2024

(54) LASER-BASED SUPPORT STRUCTURE REMOVAL

(71) Applicant: SDC U.S. SmilePay SPV, Nashville, TN (US)

(72) Inventors: Tim Wucher, Windhoek (NA); John Dargis, Nashville, TN (US); Eric Wagnon, Nashville, TN (US); Drew Marschner, Nashville, TN (US); Charlotte Xia, Nashville, TN (US); Justin Kreil, Nashville, TN (US)

(73) Assignee: SDC U.S. SmilePay SPV, Nashville, TN (US)

( * ) Notice: Subject to any disclaimer, the term of this patent is extended or adjusted under 35 U.S.C. 154(b) by 0 days.

(21) Appl. No.: 17/831,059

(22) Filed: Jun. 2, 2022

(65) Prior Publication Data

US 2023/0391017 A1    Dec. 7, 2023

(51) Int. Cl.
*B29C 64/40* (2017.01)
*A61C 7/00* (2006.01)
(Continued)

(52) U.S. Cl.
CPC .............. *B29C 64/40* (2017.08); *A61C 7/002* (2013.01); *A61C 7/08* (2013.01); *B23K 26/38* (2013.01);
(Continued)

(58) Field of Classification Search
CPC ..... B29C 64/40; B29C 64/386; B29C 64/182; B33Y 10/00; B33Y 30/00; B33Y 50/00;
(Continued)

(56) References Cited

U.S. PATENT DOCUMENTS 6,974,323 B2    12/2005  Weigl et al.
6,976,627 B1    12/2005  Culp et al.
(Continued)

FOREIGN PATENT DOCUMENTS

EP        3 025 810 A1    6/2016
WO    WO-2018/174843 A1    9/2018

OTHER PUBLICATIONS

"Invisalign Manufacturing Process English" video, uploaded to YouTube on Apr. 7, 2014, https://www.youtube.com/watch?v=vsR0_wTR2a8, 125 pages of screenshots.
(Continued)

*Primary Examiner* — Joseph S Del Sole
*Assistant Examiner* — Lawrence D. Hohenbrink, Jr.
(74) *Attorney, Agent, or Firm* — Foley & Lardner LLP

(57) ABSTRACT

Systems and methods for fabricating a dental aligner are provided. The system includes a computing system to receive and prepare a digital model of a dental aligner by adding one or more support structures to the digital model. The system includes a fabrication system to manufacture the dental aligner with the one or more support structures. The system includes a laser system to receive the fabricated dental aligner, orient the dental aligner relative to the laser system, and laser cut an interface between the support structures and the dental aligner to remove the one or more support structures from the dental aligner.

20 Claims, 9 Drawing Sheets

(51) Int. Cl.
*A61C 7/08* (2006.01)
*B33Y 10/00* (2015.01)
*B33Y 30/00* (2015.01)
*B33Y 50/00* (2015.01)
*B29C 64/182* (2017.01)
*B29C 64/386* (2017.01)
*B23K 26/38* (2014.01)
*B33Y 40/20* (2020.01)
*B29L 31/00* (2006.01)

(52) U.S. Cl.
CPC .......... *B29C 64/182* (2017.08); *B29C 64/386* (2017.08); *B33Y 10/00* (2014.12); *B33Y 30/00* (2014.12); *B33Y 40/20* (2020.01); *B33Y 50/00* (2014.12); *B29L 2031/753* (2013.01)

(58) Field of Classification Search
CPC .......... B33Y 40/20; A61C 7/002; A61C 7/08; B23K 26/38; B29L 2031/753
USPC .......................................................... 264/16
See application file for complete search history.

(56) References Cited

U.S. PATENT DOCUMENTS

| | | |
|---|---|---|
| 7,092,784 B1 | 8/2006 | Simkins |
| 7,261,533 B2 | 8/2007 | Wrosz et al. |
| 7,293,988 B2 | 11/2007 | Wen |
| 7,306,152 B2 | 12/2007 | Culp et al. |
| 7,309,230 B2 | 12/2007 | Wen |
| 7,329,122 B1 | 2/2008 | Scott |
| 7,335,024 B2 | 2/2008 | Wen |
| 7,384,266 B2 | 6/2008 | Wen |
| 7,384,807 B2 | 6/2008 | Yoo |
| 7,435,084 B2 | 10/2008 | Liu et al. |
| 7,572,121 B2 | 8/2009 | Wrosz et al. |
| 7,604,181 B2 | 10/2009 | Culp et al. |
| 7,611,058 B2 | 11/2009 | Culp et al. |
| 7,711,447 B2 | 5/2010 | Lu et al. |
| 7,831,322 B2 | 11/2010 | Liu et al. |
| 7,840,373 B2 | 11/2010 | Culp et al. |
| 7,905,408 B2 | 3/2011 | Culp et al. |
| 7,922,490 B2 | 4/2011 | Wen |
| 7,950,131 B2 | 5/2011 | Hilliard |
| 7,957,824 B2 | 6/2011 | Boronvinskih et al. |
| 7,993,134 B2 | 8/2011 | Wen |
| 7,993,136 B2 | 8/2011 | Wen |
| 8,030,588 B2 | 10/2011 | Culp et al. |
| 8,047,846 B2 | 11/2011 | Wen |
| 8,060,236 B2 | 11/2011 | Hilliard |
| 8,155,780 B2 | 4/2012 | Lu et al. |
| 8,217,304 B2 | 7/2012 | Cordingley et al. |
| 8,383,977 B2 | 2/2013 | Culp et al. |
| 8,419,430 B2 | 4/2013 | Pogorelsky |
| 8,491,305 B2 | 7/2013 | Pogorelsky |
| 8,517,726 B2 | 8/2013 | Kakavand et al. |
| 8,634,948 B2 | 1/2014 | Boronvinskih et al. |
| 8,636,513 B2 | 1/2014 | Wen |
| 8,684,729 B2 | 4/2014 | Wen |
| 8,871,132 B2 | 10/2014 | Abels et al. |
| 9,011,149 B2 | 4/2015 | Wen |
| 9,108,338 B2 | 8/2015 | Sirovskiy et al. |
| 9,152,145 B2 | 10/2015 | Culp et al. |
| 9,242,118 B2 | 1/2016 | Brawn |
| 9,299,192 B2 | 3/2016 | Kopelman |
| 9,399,256 B2 | 7/2016 | Buller et al. |
| 9,403,238 B2 | 8/2016 | Culp |
| 9,456,882 B2 | 10/2016 | Huffman |
| 9,536,020 B2 | 1/2017 | Wen |
| 9,691,110 B2 | 6/2017 | Boronvinskih et al. |
| 9,691,163 B2 | 6/2017 | Wexler et al. |
| 9,700,391 B2 | 7/2017 | Kounga et al. |
| 9,730,780 B2 | 8/2017 | Brawn et al. |
| 9,943,382 B2 | 4/2018 | Wen |
| 9,943,386 B2 | 4/2018 | Webber et al. |
| 10,011,050 B2 | 7/2018 | Kitching et al. |
| 10,098,709 B1 | 10/2018 | Kitching et al. |
| 10,099,256 B2 | 10/2018 | Culp et al. |
| 10,195,690 B2 | 2/2019 | Culp |
| 10,258,439 B1 | 4/2019 | Kitching et al. |
| 10,350,873 B2 | 7/2019 | Dufort et al. |
| 10,426,574 B2 | 10/2019 | Raby et al. |
| 10,466,676 B1 | 11/2019 | Do et al. |
| 10,624,722 B1 * | 4/2020 | Culp ..................... B23K 26/38 |
| 10,945,812 B1 | 3/2021 | Raslambekov |
| 11,104,079 B2 | 8/2021 | Parker et al. |
| 2002/0177108 A1 | 11/2002 | Pavlovskaia et al. |
| 2003/0207227 A1 | 11/2003 | Abolfathi |
| 2004/0152036 A1 | 8/2004 | Abolfathi |
| 2004/0197728 A1 | 10/2004 | Abolfathi et al. |
| 2004/0243361 A1 | 12/2004 | Steuben et al. |
| 2005/0082703 A1 | 4/2005 | Wrosz |
| 2006/0003292 A1 | 1/2006 | Lauren et al. |
| 2006/0093987 A1 | 5/2006 | Wen |
| 2006/0093993 A1 | 5/2006 | Wen |
| 2006/0102725 A1 | 5/2006 | Culp et al. |
| 2006/0127838 A1 | 6/2006 | Liu et al. |
| 2006/0127850 A1 | 6/2006 | Wen |
| 2006/0127851 A1 | 6/2006 | Wen |
| 2006/0127853 A1 | 6/2006 | Wen |
| 2006/0127855 A1 | 6/2006 | Wen |
| 2006/0127856 A1 | 6/2006 | Wen |
| 2006/0127857 A1 | 6/2006 | Zhenhuan Liu et al. |
| 2006/0127858 A1 | 6/2006 | Wen |
| 2006/0127859 A1 | 6/2006 | Wen |
| 2006/0127860 A1 | 6/2006 | Wen |
| 2006/0172259 A1 | 8/2006 | Wen |
| 2006/0199142 A1 | 9/2006 | Liu et al. |
| 2006/0199145 A1 | 9/2006 | Liu et al. |
| 2006/0199153 A1 | 9/2006 | Liu et al. |
| 2006/0275736 A1 | 12/2006 | Wen et al. |
| 2007/0164113 A1 | 7/2007 | Culp et al. |
| 2007/0243502 A1 | 10/2007 | Wen |
| 2008/0050692 A1 | 2/2008 | Hilliard |
| 2008/0102415 A1 | 5/2008 | Scott |
| 2008/0141534 A1 | 6/2008 | Hilliard |
| 2008/0187887 A1 | 8/2008 | Lu et al. |
| 2008/0215176 A1 | 9/2008 | Borovinskih et al. |
| 2008/0254402 A1 | 10/2008 | Hilliard |
| 2008/0280246 A1 | 11/2008 | Wen |
| 2008/0280258 A1 | 11/2008 | Wen |
| 2008/0280259 A1 | 11/2008 | Wen |
| 2008/0292741 A1 | 11/2008 | Wrosz et al. |
| 2008/0305454 A1 | 12/2008 | Kitching et al. |
| 2008/0306724 A1 | 12/2008 | Kitching et al. |
| 2009/0053669 A1 | 2/2009 | Liu et al. |
| 2009/0113714 A1 | 5/2009 | Greenberg |
| 2010/0173266 A1 | 7/2010 | Lu et al. |
| 2011/0104639 A1 | 5/2011 | Pogorelsky |
| 2011/0104640 A1 | 5/2011 | Pogorelsky |
| 2011/0183295 A1 | 7/2011 | Borovinskih et al. |
| 2011/0213483 A1 | 9/2011 | Borovinskih et al. |
| 2011/0236849 A1 | 9/2011 | Pogorelsky |
| 2012/0028220 A1 | 2/2012 | Wen |
| 2013/0073071 A1 | 3/2013 | Culp |
| 2013/0110469 A1 | 5/2013 | Kopelman |
| 2013/0122448 A1 | 5/2013 | Kitching |
| 2013/0144422 A1 | 6/2013 | Choi et al. |
| 2014/0131908 A1 | 5/2014 | Sun et al. |
| 2014/0277665 A1 | 9/2014 | Fisker |
| 2014/0315153 A1 | 10/2014 | Kitching et al. |
| 2015/0132707 A1 | 5/2015 | Huang et al. |
| 2015/0220662 A1 | 8/2015 | Wen |
| 2015/0314520 A1 | 11/2015 | Sirovskiy et al. |
| 2016/0058527 A1 | 3/2016 | Schumacher |
| 2016/0074138 A1 | 3/2016 | Kitching et al. |
| 2016/0166357 A1 | 6/2016 | Portalupi |
| 2016/0171128 A1 | 6/2016 | Kopelman |
| 2016/0237541 A1 | 8/2016 | Patel et al. |
| 2017/0065372 A1 | 3/2017 | Mah |
| 2017/0079749 A1 | 3/2017 | Wen |
| 2017/0100211 A1 | 4/2017 | Wen |
| 2017/0100214 A1 | 4/2017 | Wen |

(56) References Cited

U.S. PATENT DOCUMENTS

| | | |
|---|---|---|
| 2017/0112594 A1 | 4/2017 | Hilliard |
| 2017/0189154 A1 | 7/2017 | Allen et al. |
| 2017/0270238 A1 | 9/2017 | Borovinskih et al. |
| 2017/0304023 A1 | 10/2017 | Tsai et al. |
| 2017/0367791 A1 | 12/2017 | Raby et al. |
| 2017/0367792 A1 | 12/2017 | Raby et al. |
| 2018/0000564 A1 | 1/2018 | Cam et al. |
| 2018/0008389 A1 | 1/2018 | Allen et al. |
| 2018/0049847 A1 | 2/2018 | Oda et al. |
| 2018/0092714 A1 | 4/2018 | Kitching et al. |
| 2018/0116762 A1 | 5/2018 | Kopelman |
| 2018/0153648 A1 | 6/2018 | Shanjani et al. |
| 2018/0165818 A1 | 6/2018 | Tsai et al. |
| 2018/0177570 A1 | 6/2018 | Alauddin et al. |
| 2018/0200034 A1 | 7/2018 | Deville et al. |
| 2018/0243052 A1 | 8/2018 | Lee |
| 2018/0250098 A1 | 9/2018 | Wen |
| 2018/0304497 A1 | 10/2018 | Kitching et al. |
| 2018/0333226 A1 | 11/2018 | Tsai et al. |
| 2019/0008612 A1 | 1/2019 | Kitching et al. |
| 2019/0039100 A1 | 2/2019 | Culp et al. |
| 2019/0102880 A1 | 4/2019 | Parpara et al. |
| 2019/0160590 A1 | 5/2019 | Culp |
| 2019/0167384 A1 | 6/2019 | Borovinskih et al. |
| 2019/0321136 A1 | 10/2019 | Martz et al. |
| 2019/0328494 A1 | 10/2019 | Barone et al. |
| 2019/0389139 A1 | 12/2019 | Wu et al. |
| 2020/0015937 A1 | 1/2020 | Stewart |
| 2020/0198250 A1 | 6/2020 | Shitrit et al. |
| 2020/0281689 A1 | 9/2020 | Yancey et al. |
| 2020/0306017 A1* | 10/2020 | Chavez .................. A61C 7/002 |
| 2021/0196430 A1 | 7/2021 | Wilson et al. |
| 2021/0298874 A1* | 9/2021 | Katzman ................ G16H 10/60 |
| 2022/0009164 A1* | 1/2022 | Jacimovic ............. B29C 64/379 |

OTHER PUBLICATIONS

International Search Report And Written Opinion for International Application No. PCT/US2020/020728, dated Jun. 8, 2020, 6 pages.
International Search Report and Written Opinion for International Application No. PCT/US2020/027044, dated Jul. 16, 2020, 8 pages.
International Search Report and Written Opinion of International Application No. PCT/US2020/046150, dated Oct. 26, 2020, 13 pages.
Lin et al., "3D CAD for Design of Invisible Tooth Aligner", Proceedings of the 2005 IEEE International Conference of Mechatronics, Jul. 10-12, 2005, pp. 647-651 (Year: 2005).
Lin et al., "Integration of 3 D CAD, Reverse Engineering and Rapid Prototyping in Fabrication of Invisible Tooth Aligner", 2005 IEEE International Conference on Systems, Man and Cybernetics, Oct. 12-12, 2005, pp. 2431-2436, (Year: 2005).
Low, Perspective on 3D Printing of Separation Membranes and Comparison to Related Unconventional Fabrication Techniques, Journal of Membrane Science vol. 523, Feb. 1, 2017, pp. 596-613.
Somers, Jamie, "Tech tip: Undesirable undercuts", The Clearcorrect Blog, http://blog.clearcorrect.com/category/tech-tips.aspx?page=10, Oct. 16, 2015, 12 pages.
Wise, John, "Keeping the 'special' in the orthodontic specialty: part 1", Orthodontic Practice US, https://orthopracticeus.com/keeping-special-orthodontic-specialty-part-1, 2017, 10 pages.
Wong, Practical Support Structures for Selective Laser Melting, Journal of Materials Processing Technology, vol. 238, Dec. 2016, pp. 474-484.

* cited by examiner

FIG. 6A
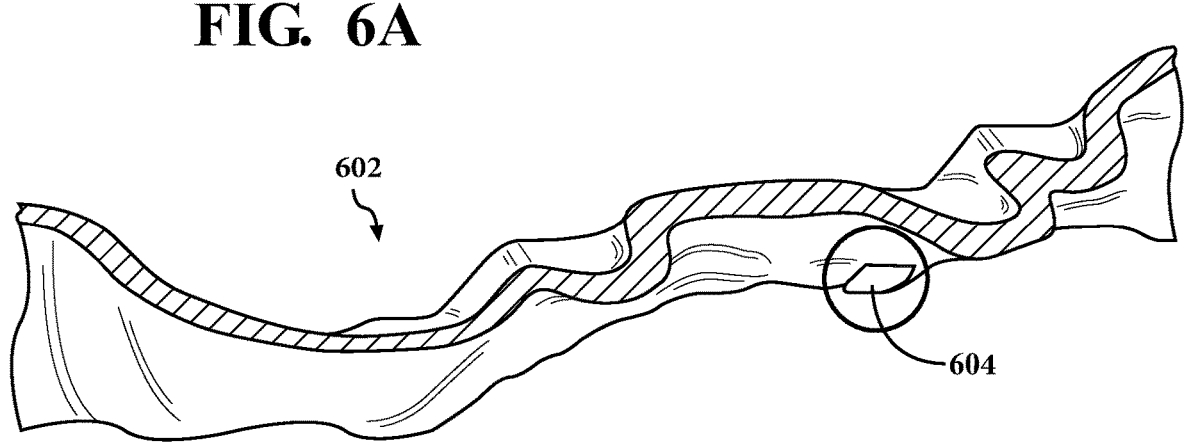
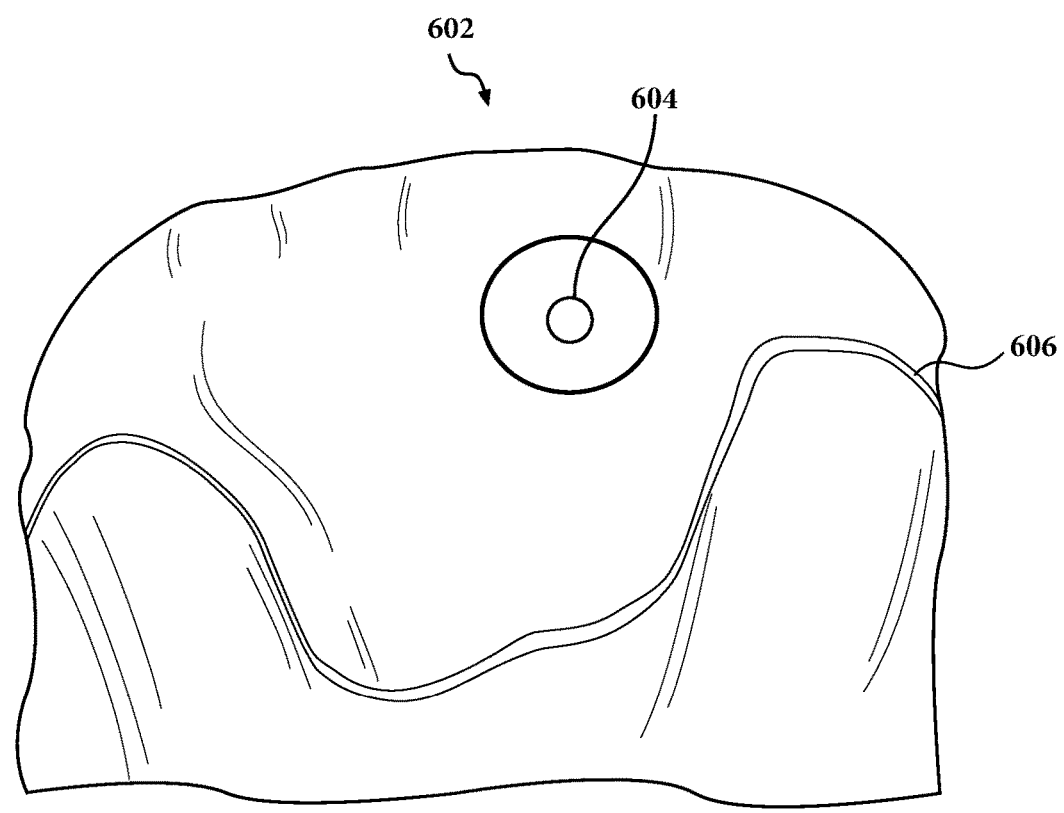
FIG. 6B

LASER-BASED SUPPORT STRUCTURE REMOVAL

TECHNICAL FIELD

The present disclosure relates generally to the field of dental treatment, and more specifically, to systems and methods for preparing and fabricating an orthodontic aligner via additive manufacturing.

BACKGROUND

Intraoral devices may be worn by a patient receiving orthodontic treatment. Some intraoral devices, such as dental aligners, retainers, and dentures, may be fabricated via additive manufacturing. In some circumstances, certain geometries of the intraoral devices may require specific supporting structures provided during manufacturing to maintain the structural integrity of the intraoral devices. Such supporting structures may interfere with orthodontic treatment if not properly removed from the intraoral device after the intraoral device has been manufactured. Thus, there is a need for an efficient and accurate means of fabricating intraoral devices with supporting structures and removing the supporting structures post-fabrication.

SUMMARY

In one aspect, this disclosure is directed to a method. The method includes receiving, by a computing system, a digital model of a dental aligner configured to move one or more teeth based on a generated treatment plan; preparing, by the computing system, the digital model of the dental aligner for manufacturing, wherein preparing the digital model of the dental aligner includes modifying the digital model by adding one or more support structures to the digital model to be formed with the dental aligner; forming, via additive manufacturing, the dental aligner with the support structures based on the modified digital model; receiving, by a laser system, the dental aligner with the support structures; orienting, by the laser system, the dental aligner with the support structures relative to the laser system, wherein orienting the dental aligner includes locating one or more features of the dental aligner relative to the laser system; and cutting, by the laser system, an interface between the support structures and the dental aligner to remove the support structures from the dental aligner.

In another aspect, this disclosure is directed to a laser system. The laser system includes one or more processors and memory storing instructions that, when executed by the one or more processors, cause the one or more processors to: receive a data packet including dental aligner information associated with a dental aligner, the dental aligner having one or more support structures formed with the dental aligner via additive manufacturing; orient, by a fixture, the dental aligner and the support structures, wherein orienting the dental aligner includes locating one or more features of the dental aligner relative to the laser system based on the received dental aligner information; and cut, by a laser beam, an interface between the support structures and the dental aligner to remove the support structures from the dental aligner.

In yet another aspect, this disclosure is directed to a system. The system includes a fabrication computing system having one or more processors and memory storing instructions that, when executed by the one or more processors, cause the one or more processors to: receive a digital model of a dental aligner configured to move one or more teeth based on a generated treatment plan; and prepare the digital model of the dental aligner for manufacturing, wherein preparing the digital model of the dental aligner includes modifying the digital model by adding one or more support structures to the digital model to be formed with the dental aligner; a 3D printing fabrication system configured to print the dental aligner with the support structures; and a laser system having one or more processors and memory storing instructions that, when executed by the one or more processors, cause the one or more processors to: orient, by a fixture, the dental aligner with the support structures, wherein orienting the dental aligner includes locating one or more features of the dental aligner relative to the laser system; and cut, by a laser beam, an interface between the support structures and the dental aligner to remove the support structures from the dental aligner.

Various other embodiments and aspects of the disclosure will become apparent based on the drawings and detailed description of the following disclosure.

BRIEF DESCRIPTION OF THE DRAWINGS

FIGS. 6A-6B show a portion of a 3D model of an orthodontic aligner having an identified support area, according to an illustrative embodiment.

DETAILED DESCRIPTION

Figure 1:
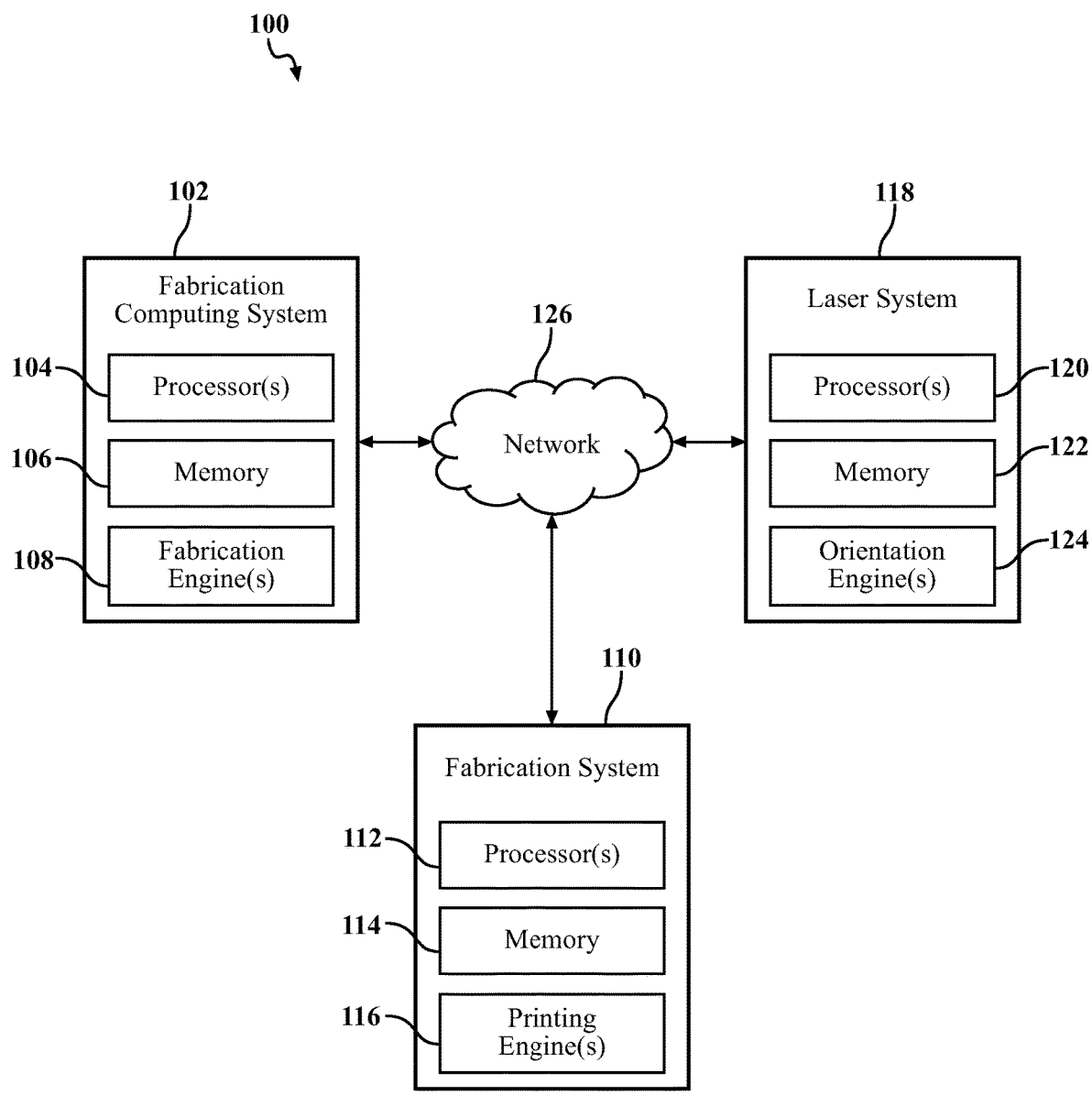
FIG. 1 shows a system for orthodontic treatment, according to an illustrative embodiment.

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, described herein are systems and methods for preparing and fabricating intraoral devices, such as dental aligners. The systems and methods described herein may prepare a digital model of a dental aligner for fabrication of the dental aligner. The systems and methods described herein may prepare the digital model by adding one or more support structures, mounting structures, or locatable orientation features to the digital model. The systems and methods described herein may fabricate the dental aligner via one or more additive manufacturing processes based on the prepared digital model. The systems and methods described herein may treat the fabricated dental aligner post-manufacturing. The systems and methods described herein may receive and orient the fabricated dental aligner and remove one or more portions of the dental aligner via a laser beam. While the present disclosure generally refers to dental aligners specifically throughout, it will be appreciated that the systems and methods disclosed herein could also be used to fabricate other intraoral devices, such as retainers, dentures, and mouth guards, among other devices.

According to some embodiments, one or more computing systems analyze a digital model of a pre-fabricated dental aligner (e.g., a three-dimensional ("3D") digital model of the dental aligner based on a generated treatment plan) to optimize the dental aligner for fabrication. For example, in some embodiments, the computing systems analyze the 3D model to determine if support structures are required to maintain the structural geometry of the dental aligner during fabrication. The computing systems may add (e.g., model) the required support structures to the 3D model for fabrication via additive manufacturing. In some embodiments, the computing systems may orient the fabricated dental aligner and remove the support structures post-fabrication by laser cutting the support structures. In some embodiments, the computing systems may optimize a fabrication system to fabricate a plurality of dental aligners. For example, the computing systems may determine, based on one or more 3D models, an orientation of one or more of the dental aligners during fabrication to i) minimize required support structures of each dental aligner and ii) maximize the amount of dental aligners fabricated at the same time or via the same fabrication system.

The systems and methods described herein may have many benefits over existing fabrication systems. For example, by identifying areas of a 3D model that require support structures, the systems and methods described herein may enable repeatable and accurate fabrication outcomes that are not capable of being performed by a human mind. Additionally, the computer-based systems and methods described herein are rooted in computer analysis of 3D data of dental aligners to determine an optimized fabrication technique, which is not prone to the subjectivity of a human. Further, by orienting and cutting a fabricated dental aligner using computer-aided 3D data, the systems and methods described herein are more precise and more efficient than traditional manual fabrication systems which cannot produce the same level of immediate visualization, accuracy, and meticulousness as the computer-based treatment plan described herein.

Furthermore, laser cutting material from dental aligners may have many benefits over existing removal techniques. For example, manually breaking off material (e.g., pulling off support materials by hand) can result in sharp edges and unwanted defects. By using a laser to cut material from an aligner, the systems and methods described herein may reduce additional surface polishing of the aligner (e.g., by reducing sharp edges) and may increase accuracy or stability of the aligner (e.g., by reducing unwanted defects). As another example, dissolving the material (e.g., by submersing a fabricated part in a liquid for a period of time) can negatively impact mechanical properties or surface finish of materials of the aligner. Further, dissolving the materials may not fully remove all of the supporting materials, which may require additional techniques to remove the materials completely. By using a laser, the systems and methods described herein may reduce or eliminate abnormalities in the surface finish of the aligner. As another example, mechanically cutting supporting materials (e.g., via a mechanical cutting CNC machine, using a robotic system, etc.) can result in rough edges along a line of cutting. By using a laser, the systems and methods described herein may increase smoothness and consistency of edges formed as a result of a cut line as the laser melts the material while cutting. Various other technical benefits and advantages are described in greater detail below.

Referring to FIG. 1, a system 100 for fabricating orthodontic aligners is shown, according to an illustrative embodiment. As shown in FIG. 1, the system 100 includes a fabrication computing system 102 communicably coupled to a fabrication system 110, and/or a laser system 118. In some embodiments, the fabrication computing system 102 may be or may include one or more servers which are communicably coupled to a plurality of computing devices. In some embodiments, the fabrication computing system 102 may include a plurality of servers, which may be located at a common location (e.g., a server bank) or may be distributed across a plurality of locations. The fabrication computing system 102 may be communicably coupled to the fabrication system 110, and/or a laser system 118 via a communications link or network 126 (which may be or may include various network connections configured to communicate, transmit, receive, or otherwise exchange data between addresses corresponding to the systems 102, 110, 118). The network 126 may be a Local Area Network (LAN), a Wide Area Network (WAN), a Wireless Local Area Network (WLAN), an Internet Area Network (IAN) or cloud-based network, etc. The network 126 may facilitate communication between the respective components of the system 100, as described in greater detail below.

The systems 102, 110, 118 include one or more processing circuits, which may each include processor(s) 104, 112, 120 and memory 106, 114, 122. The processor(s) 104, 112, 120 may be a general purpose or specific purpose processor, an application specific integrated circuit (ASIC), one or more field programmable gate arrays (FPGAs), a group of processing components, or other suitable processing components. The processor(s) 104, 112, 120 may be configured to execute computer code or instructions stored in memory 106, 114, 122 or received from other computer readable media (e.g., CDROM, network storage, a remote server, etc.) to perform one or more of the processes described herein. The memory 106, 114, 122 may include one or more data storage devices (e.g., memory units, memory devices, computer-readable storage media, etc.) configured to store data, computer code, executable instructions, or other forms of computer-readable information. The memory 106, 114, 122 may include random access memory (RAM), read-only memory (ROM), hard drive storage, temporary storage, non-volatile memory, flash memory, optical memory, or any other suitable memory for storing software objects and/or computer instructions. The memory 106, 114, 122 may include database components, object code components, script components, or any other type of information structure for supporting the various activities and information structures described in the present disclosure. The memory 106, 114, 122 may be communicably connected to the processor 104, 112, 120 via the processing circuit, and may include computer code for executing (e.g., by processor(s) 104, 112, 120) one or more of the processes described herein.

The fabrication computing system 102 is shown to include one or more fabrication engines 108. The fabrication engine 108 can be or can include components configured to transmit and/or receive dental aligner data from one or more remote sources (such as the computing devices, components, and/or systems described herein) for generating a 3D digital model (e.g., a 3D digital representation, a 3D image, a 3D scan, a computer aided design (CAD) model, a point cloud, etc.) of a dental aligner 202 (shown in FIG. 2) and preparing the digital model of the dental aligner 202 for fabrication of the dental aligner 202. For example, the fabrication engine 108 can be or can include components configured to receive a digital model of a dental aligner 202 corresponding to a generated treatment plan based on a dental dentition or arch of a patient, as described in greater detail below. The fabrication engine 108 can be configured to prepare the received digital model of a dental aligner 202 for fabricating the dental aligner 202. In some embodiments, each of the servers, systems and/or computing devices may include respective fabrication engines 108 which permit exchange of data (e.g., corresponding to the digital model) between the respective components of the system 100. As such, each of the respective fabrication engines 108 may permit or otherwise enable dental aligner data to be exchanged between the respective systems 102, 110, 118. In some implementations, communications device(s) may access the network 126 to exchange data with various other communications device(s) via cellular access, a modem, broadband, Wi-Fi, satellite access, etc. via the fabrication engines 108.

The fabrication system 110 can be or can include an additive manufacturing system (e.g., any 3D printing device described herein) having one or more servers which are communicably coupled to a plurality of computing devices. The fabrication system 110 is shown to include one or more printing engines 116. The printing engine 116 may be any device(s), component(s), circuit(s), or other combination of hardware components designed or implemented to receive inputs for fabricating a dental aligner 202 and/or to automatically fabricate a dental aligner 202 based on the digital model. In some embodiments, the printing engines 116 may be instructions stored in memory 106, 114, 122 which are executable by the processor(s) 104, 112, 120.

The laser system 118 can be or can include any laser cutting systems (e.g., a machine having a powered laser beam to cut or etch materials such as metal or non-metals) having one or more servers which are communicably coupled to a plurality of computing devices. The laser system 118 is shown to include an orientation engine 124. The orientation engine 124 can be or can include any device(s), component(s), circuit(s), or other combination of hardware components designed or implemented to orient or locate certain features of a received fabricated dental aligner 202, as described in greater detail below. In some embodiments, the orientation engine 124 may be instructions stored in memory 106, 114, 122 which are executable by the processor(s) 104, 112, 120. The laser system 118 can be or can include any of the systems or processes described within U.S. patent application Ser. No. 16/851,948, filed Apr. 17, 2020, and U.S. patent application Ser. No. 16/540,259, filed Aug. 14, 2019, both of which are herein incorporated by reference in their entirety.

Figure 2:
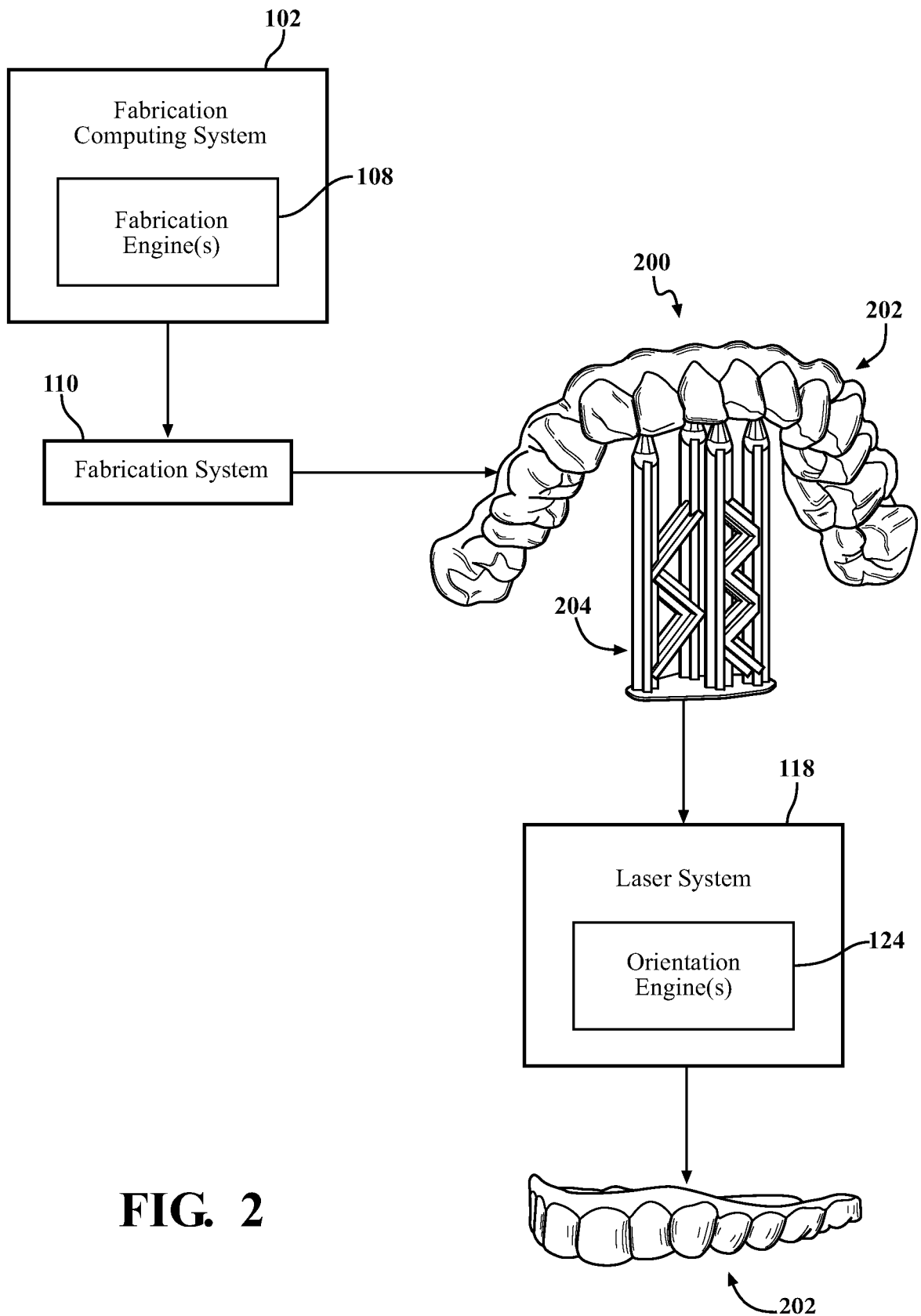
FIG. 2 shows a process flow of generating an orthodontic aligner, according to an illustrative embodiment.

Referring to FIG. 2, a fabrication process flow which may be implemented by the system 100 of FIG. 1 is shown according to an illustrative embodiment. The system 100 may be configured to receive, by the fabrication computing system 102, a digital model of a dental aligner 202, prepare, by the fabrication computing system 102, the digital model of the dental aligner 202 for fabrication by modeling one or more added support structures 204, fabricate, by the fabrication system 110, the dental aligner assembly 200 with a dental aligner 202 and support structures 204, and cut, by the laser system 118, an interface (e.g., joint, connection, etc.) between the dental aligner 202 and the support structures 204 to remove the support structures 204 from the fabricated dental aligner assembly 200. In some embodiments, the interface may include at least a portion of the support structure 204. In some embodiments, the fabrication computing system 102 may be communicably coupled to, or otherwise include, one or more computing systems configured to produce, generate, assemble, receive, comprise, or otherwise create a treatment plan for moving teeth of a patient's dentition. In some embodiments, the treatment plan may be a series of movements of teeth of a patient's dentition from a starting arrangement to an ending arrangement. In some embodiments, the treatment plan may be generated by or through use of a treatment planning computing system communicably coupled to the fabrication computing system 102. In some embodiments, a dental technician or professional uses a treatment planning computing system to generate the treatment plan by manipulating individual teeth or groups of teeth shown in a 3D model of the patient's dentition. For instance, the treatment planning computing system may be communicably coupled to scanning devices and/or additional computing systems via a wired or wireless connection to receive one or more digital representations of the patient's dentition (e.g., an upper arch of a patient and a lower arch of a patient), such as 2D images, 3D images, video, or a scan of the patient's teeth captured using a mobile device associated with the patient or a scanning device. The scanning devices may be or may include any device, component, or hardware designed or implemented to generate, capture, or otherwise produce a model of an object, such as a dentition or dental arch, to facilitate generating a treatment plan for the dentitions or dental arches. The 3D model of the patient's dentition can be generated based on 2D images or video obtained via a mobile device, such as a smartphone or tablet, associated with the patient. The 3D model of the patient's dentition can be generated using any of the systems or processes described within U.S. patent application Ser. No. 17/247,055, filed Nov. 25, 2020, which is herein incorporated by reference in its entirety.

The treatment planning computing system may be configured to generate various stages of the treatment plan to move the teeth from the starting position (e.g., a current position as represented within the digital representations from one or more scanning devices) to a final position. For instance, the treatment planning computing system may be configured to generate and analyze one or more 3D models of the patient's dentition based on the digital representations from the one or more scanning devices to align teeth with a dental arch fitted to the teeth. The computing system may be configured to generate various stages of the treatment plan to move the teeth from the starting position to the final position. In some embodiments, the treatment planning computing system may be configured to generate a 3D model of a dental aligner 202 for a patient to be worn at each stage of the treatment plan for a predetermined duration (e.g., one week, two weeks). As depicted in the Figures, the dental aligner 202 is shown as being for a single dental arch of the patient. However, it will be appreciated that for each stage of a treatment plan, a dental aligner 202 may be created for an upper dental arch and a lower dental arch of the patient. The dental aligner 202 may be designed to apply forces to one or more teeth to move the one or more teeth from an initial position to an intermediate position or towards the final position of the generated treatment plan.

The fabrication computing system 102 may be configured to receive one or more digital models of one or more dental aligners 202 via the fabrication engine 108. For example, the fabrication computing system 102 may be configured to receive one or more digital models of the dental aligners 202 generated according to the various stages of the treatment plan. As described above, the fabrication engine 108 may be or may include any device(s), component(s), circuit(s), or other combination of hardware components designed or implemented to transmit and/or receive dental aligner data from one or more remote sources (such as the computing devices, components, and/or systems described herein) for receiving a 3D digital model of a dental aligner 202 and preparing the digital model of the dental aligner 202 for fabrication. In some embodiments, the fabrication engine 108 may be configured to receive a digital file comprising one or more 3D models of a dental aligner 202 based on the generated treatment plan. For example, the fabrication engine 108 may be configured to receive an OBJ file, an STL file, or the like.

The fabrication engine 108 may be configured to analyze the 3D model of the dental aligner 202. For example, the fabrication engine 108 may be configured to analyze one or more portions of the 3D model of the dental aligner 202 to optimize fabrication of the dental aligner 202. The fabrication engine 108 may be configured to analyze the 3D model of the dental aligner 202 to determine if the dental aligner 202 requires support material or support structure, shown and described as support structures 204, to maintain the structural and/or geometric stability of the dental aligner 202 during fabrication. For example, in some embodiments, the dental aligner 202 is fabricated via one or more additive manufacturing techniques including, but not limited to, vat polymerization (e.g., digital light processing ("DLP"), continuous liquid interface production, stereolithography ("SLA") 3D printing), powder bed fusion (e.g., selective laser sintering), binder jetting, material jetting, and/or material extrusion (e.g., fused deposition modeling). During additive manufacturing of the dental aligners 202, one or more portions of the dental aligners 202 (e.g., overhangs, bridges, convex portions, concave portions, etc.) may require support structures 204 to properly support a portion of the dental aligner 202 during the manufacturing process to ensure a stable and successful manufacture. For the purposes of this disclosure, "support structure" includes any material or structures used to support the dental aligner 202 during manufacturing that are at least partially removed or decoupled prior to use by a patient. For example, as shown in FIG. 2, the manufactured aligner assembly 200 includes a dental aligner 202 and a plurality of support structures 204 formed with the dental aligner 202. In some embodiments, the fabrication engine 108 may be configured to analyze the 3D model of the dental aligner 202 to determine one or more materials of the dental aligner assembly 200. For example, the fabrication engine 108 may be configured to analyze the 3D model to determine a first material for the dental aligner 202 and a second material for the support structures 204. In some embodiments, the first and second materials may differ. In some embodiments, the first and second materials may be the same. In some embodiments, the dental aligner 202 and/or the support structures 204 can each be formed from multiple materials.

The fabrication engine 108 may be configured to prepare the 3D model of the dental aligner 202 for fabrication by identifying one or more points or areas of the 3D model of the dental aligner 202 that require a support structure 204, as described in greater detail below with reference to FIGS. 5B-7B. In some embodiments, the fabrication engine 108 may use various suitable algorithms to automatically detect potential areas in the digital model of the dental aligner 202 that require support structures 204. For example, the fabrication engine 108 may be configured to use an algorithm that determines the most convex portions of a surface of the 3D model of the aligner 202. In some embodiments, the fabrication engine 108 may be configured to use an algorithm that determines suitable areas for placement of the support structures 204 based on their position relative to a build surface described herein (e.g., localized points and/or areas of the 3D model of the aligner 202 with the smallest distance relative to a surface in which the aligner 202 is fabricated may be selected for placement of support structures 204). In some embodiments, the fabrication engine 108 may be configured to use an algorithm that determines areas and/or points of the aligner 202 that are least likely to impact the fit of the aligner 202 on the patient's teeth or the comfort of the aligner 202 relative to the patient. For example, material and/or artifacts remaining on the lingual surfaces of an aligner 202 (e.g., closest to the tongue) may be more likely to be felt by a tongue of a patient. Similarly, materials on areas of the aligner 202 that contact the gums are more likely to cause irritation. Thus, the fabrication engine 108 may be configured to identify portions of the 3D model positioned away from these locations as an optimal position for support structures 204. Once identified, the fabrication engine 108 may be configured to add the required support structures 204 to the 3D model at the identified points and/or areas (e.g., to identified coordinates of a 3D model, to identified points of a point cloud, etc.) and transmit the prepared 3D model to the fabrication system 110. The fabrication engine 108 may be configured to add (e.g., generate) the digital representation of the support structures 204 to the 3D model using any suitable methods or devices such as, for example, by receiving a digital file of a digital representation of a support structure 204.

In some embodiments, the fabrication engine 108 may be configured to prepare the 3D model of the dental aligner 202 by adding one or more mounting structures and/or materials to the 3D model. For example, as described in greater detail below, the fabrication engine 108 may be configured to add one or more mounting apertures, protrusions, surfaces, supports, or other alignment features to the 3D model of the dental aligner 202 or the support structures 204 such that one or more portions of the laser system 118 can receive the manufactured dental aligner 202 via the mounting structures. The fabrication engine 108 may be configured to add (e.g., generate) the digital representation of the mounting structures to the 3D model using any suitable methods or devices such as, for example, by receiving a digital file of a digital representation of a mounting structure. In some embodiments, the fabrication engine 108 may be configured to add one or more locatable orientation features to the 3D model of the dental aligner 202. For example, the fabrication engine 108 may be configured to add readable indicia, a fiducial marker, an image, a signature, a logo, a data matrix, an RFID tag, or similar feature to the 3D model such that the dental aligner 202 is fabricated with the locatable feature. The fabrication engine 108 may be configured to add (e.g., generate) the digital representation of the locatable features to the 3D model using any suitable methods or devices such as, for example, by receiving a digital file of a digital representation of a locatable feature. In some embodiments, the fabrication engine 108 may be configured to prepare and/or evaluate different materials of the dental aligner 202 and/or the added support structures 204.

The printing engine 116 of the fabrication system 110 may be configured to fabricate a dental aligner assembly 200 based on the received dental aligner data (e.g., the prepared 3D model). As described above, the printing engine 116 may be any device(s), component(s), circuit(s), or other combination of hardware components designed or implemented to receive inputs for fabricating a dental aligner 202 and/or to automatically fabricate a dental aligner 202 based on the digital model. For example, in some embodiments, the printing engine 116 may be configured to automatically cause (e.g., "trigger") the fabrication system 110 to fabricate the dental aligner 202 in response to receiving the 3D model. In some embodiments, the printing engine 116 may be configured to cause the fabrication system 110 to fabricate the dental aligner 202 in response to one or more inputs to the fabrication system 110 (e.g., a user input to a graphical user interface of the fabrication system 110, a user input to a keypad of the fabrication system 110, etc.) to begin manufacturing. As described above, the fabrication system 110 can be, or can include, any system configured to manufacture a dental aligner 202 via one or more of the additive manufacturing techniques described herein.

The printing engine 116 may be configured to cause the dental aligner assembly 200 to be manufactured. For example, the printing engine 116 may be configured to transfer one or more signals and/or messages to one or more components (e.g., printers) of the fabrication system 110 to manufacture the dental aligner assembly 200 including the dental aligner 202 and the support structures 204. In some embodiments, the support structures 204 are integrally formed with the dental aligner 202. For example, the fabrication system 110 may be configured to manufacture the support structures 204 directly with the dental aligner 202 such that the support structures 204 are fixed with one or more portions of the dental aligner 202. As described above, in some embodiments, the fabrication system 110 may be configured to manufacture one or more mounting structures with the dental aligner assembly 200. In some embodiments, the fabrication system 110 may be configured to manufacture one or more locatable orientation features on the dental aligner assembly 200 (e.g., on the dental aligner 202 or on the support structures 204). For example, the fabrication system 110 may be configured to manufacture (e.g., print) one or more fiducial markers, images, signatures, logos, barcodes, QR codes, data matrices, RFID tags, or similar features. In some examples, the fabrication system 110 may be configured to place a data matrix or similar marker at a base of the support structures 204 that is parallel to a build surface 502 described herein. For example, the fabrication system 110 may be configured to place a marker on a base of a support structure 204 extending away from the aligner 202 but on the build surface 502 where it is more easily visible and can be scanned, identified, or read by a camera system. In some embodiments, the orientation feature can be removed along with the support structures (e.g., the orientation feature is located on one or more support structures, forms one or more of the support structures, or is separate from the support structures but also removed by the laser when support structures are removed). As described herein, the printing engine 116 may be configured to fabricate the aligner 202 and/or the support structures 204 from one or more materials.

In some embodiments, the system 100 may include one or more components to treat the dental aligner assembly 200 post-manufacturing. For example, the system 100 may include one or more curing systems (e.g., an ultraviolet ("UV") curing system) to cure the dental aligner assembly 200 after fabrication of the dental aligner assembly 200. The curing system may be configured to cure the dental aligner assembly 200 for various amounts of time. For example, the curing system may be configured to cure the dental aligner assembly 200 for 1 minute. The curing system may be configured to cure the dental aligner assembly 200 for 60 minutes, as another example. The curing system may be configured to cure the dental aligner 202 for various amounts of time depending on the properties of the curing system. According to one embodiment, the curing system may be configured to cure the dental aligner assembly 200 for any amount of time in the range of 1 to 60 minutes (e.g., about 20 to 30 minutes). In some embodiments, the system 100 may include one or more other post-processing systems including, but not limited to, a cleaning system (e.g., a washing area to clean the dental aligner assembly 200 using one or more solvents such as isopropyl alcohol ("IPA"), tripropylene glycol monomethyl ether ("TPM"), or the like), a spinning system, a sandblasting system, or a tumbling system (e.g., a system that vibrates the dental aligner assembly 200 with or without abrasive or polishing particles) to prepare the dental aligner assembly 200 (e.g., harden the material of the dental aligner assembly 200, remove jagged edges, increase surface shine, etc.).

The laser system 118 may be configured to receive the fabricated dental aligner assembly 200. For example, one or more fixtures (e.g., apertures, surfaces, clamps, vices, receiving modules, or other portions of the laser system 118 capable of receiving and/or coupling a dental aligner assembly 200 to the laser system 118) may be configured to receive one or more portions of the dental aligner assembly 200 such that the dental aligner assembly 200 is fixed relative to the laser system 118. In some embodiments, the laser system 118 may be configured to receive the dental aligner assembly 200 such that the dental aligner assembly 200 is movably fixed relative to a laser of the laser system 118. In some embodiments, the laser system 118 may be configured to receive the dental aligner assembly 200 post-processing (e.g., subsequent to at least one of curing, cleaning, spinning, tumbling, or other post-processing technique). This may provide various improvements in comparison to typical support structure removal techniques. For example, by laser cutting the support structures 204 subsequent to curing the dental aligner assembly 200, the dental aligner 202 may be less malleable. This may reduce unnecessary deformation of the dental aligner 202 as compared to typical methods of removing the support structures 204 (e.g., manually by hand, via CNC machining, using one or more solvents, etc.) In some embodiments, the laser system 118 may be configured to receive one or more mounting structures of the dental aligner assembly 200. As described above, the mounting structures may include one or more apertures, protrusions, alignment features, or the like to facilitate fixing the dental aligner assembly 200 to one or more portions of the laser system 118. For example, a fixture of the laser system 118 may be configured to couple to the dental aligner assembly 200 by directly contacting one or more portions of the mounting structures.

The laser system 118 may be configured to orient the dental aligner assembly 200 with the dental aligner 202 and the support structures 204 relative to the laser system 118. For example, the orientation engine 124 may be configured to locate one or more features of the dental aligner assembly 200 relative to the laser system 118. As described above, the orientation engine 124 can be or can include any device(s), component(s), circuit(s), or other combination of hardware components designed or implemented to orient or locate certain features of a received fabricated dental aligner. In some embodiments, the orientation engine 124 may be configured to locate a fiducial marker, an image, a signature, a logo, a barcode, a QR code, a data matrix, an RFID tag, or similar feature located on a portion of the dental aligner assembly 200 (e.g., on at least one of the dental aligner 202 or the support structures 204). In some embodiments, the orientation engine 124 may include an optical reader, scanner, or the like to locate (e.g., scan) the orientation feature. In some embodiments, the orientation engine 124 may be configured to receive one or more data packets from another portion of the system 100 (e.g., from the fabrication engine 108). For example, the data packet may include 3D data corresponding to the 3D model of the fabricated dental aligner 202. The orientation engine 124 may be configured to extract one or more coordinates or points of the 3D model that correspond to a location of the locatable orientation feature. The orientation engine 124 may be configured to compare one or more of the extracted points of the 3D model with the scanned orientation feature to determine a location of the orientation feature on the fabricated dental aligner assembly 200 relative to the laser system 118. The orientation engine 124 may be configured to determine, based on the comparison, a contour (e.g., shape, orientation, location) of the dental aligner assembly 200.

In some embodiments, the orientation engine 124 may be configured to determine at least one of a beam width, power, or wavelength of the laser based on the received data packet. For example, the laser system 118 can be or can include one or more integrated motion systems communicably coupled to the orientation engine 124 and configured to cut and/or modify the fabricated dental aligner 202. The integrated motion system may include a positioning system comprising one or more motion stages to position the model of the aligner 202 relative to the laser system 118 in three dimensions. The positioning system may further include motorized stages allowing control of the orientation of the aligner 202 to position the aligner 202 relative to the laser system 118 in six degrees of freedom.

The orientation engine 124 may be configured to cause one or more portions of the laser system 118 to orient (e.g., move, rotate, etc.) the aligner assembly 200 relative to another portion of the laser system 118. For example, the orientation engine 124 may be configured to orient the dental aligner assembly 200 relative to a laser of the laser system 118. In some embodiments, the orientation engine 124 may be configured to align a portion of the locatable orientation feature with a pathway of the laser of the laser system 118. In some embodiments, the orientation engine 124 may be configured to align the orientation feature with another portion of the laser system 118 such that the pathway of the laser is at an angle to the orientation feature. As utilized herein, the "pathway" of the laser refers to the path in which the laser emits a beam towards an element. In some embodiments, the laser emits a laser beam towards an optical element (e.g., mirror, lens, prism, grating, etc.) that is configured to rotate and/or direct the laser beam towards the dental aligner assembly 200 to cut or etch a portion of the dental aligner assembly 200. In some embodiments, the laser emits a laser beam directly towards a portion of the dental aligner assembly 200 to cut or etch a portion of the dental aligner assembly 200.

In some embodiments, the orientation engine 124 may be configured to identify one or more points and/or lines of the dental aligner 202 to cut the dental aligner 202. For example, the orientation engine 124 may be configured to identify a line of the dental aligner 202 corresponding to a line of the 3D model of the dental aligner 202 for the laser to follow the line and remove one or more portions of the dental aligner 202 extending from the line (e.g., the support structures 204, the mounting structures, unwanted materials, etc.). In some embodiments, the orientation engine 124 may be configured to perform a collision analysis using an algorithm to determine whether the laser will cut a non-cutting portion of the dental aligner 202 (e.g., a portion of the dental aligner 202 configured to interface with teeth of a patient) or a portion of the support structures 204 that is not intended to be cut. The collision analysis may include defining a ray extending through the identified line and at an angle of the travel path (e.g., at the angle defined by an outer edge of the aligner 202 and the line). The collision analysis may include determining whether the ray intersects or contacts any non-cutting portions of the dental aligner 202, such as portions configured to interface with teeth, portions configured to interface with the gingiva (gums) above the teeth, any non-cutting portions of the support structures 204, etc. The collision analysis may include re-defining the cut line responsive to determining that the laser will cut a non-cutting portion of the dental aligner 202. The orientation engine 124 may be configured to adjust various points on the identified line (e.g., including the distance between the line and an edge of the aligner 202) to prevent or avoid cutting a non-cutting portion of the dental aligner 202 or a non-cutting portion of the support structures 204. The orientation engine 124 may adjust the angle of the laser (e.g., the angle defined by the travel path) to prevent or avoid cutting a non-cutting portion of the dental aligner 202.

The orientation engine 124 may be configured to determine a cutting or non-cutting part of the aligner 202 and/or a cutting or non-cutting part of the support structures 204 based on the function of a portion of the aligner 202 and/or support structure 204. For example, the aligner 202 may have areas that are designed to offer stability during the manufacturing process but are not part of the final product and may be considered cutting parts of the aligner 202. Similarly, some parts of the aligner 202 or the support structures 204 may include one or more different materials which can be placed at different locations on the fabricated aligner 202 or that can include of one or more layers having different material properties. In these embodiments, one layer could be considered a cutting part of the aligner 202 while the second layer at the same location on the aligner 202 may be considered a non-cutting part.

In some embodiments, the orientation engine 124 may be configured to modify a power of the laser (e.g., by limiting or restricting a power provided to the laser or otherwise throttling the laser). For example, the orientation engine 124 may be configured to limit or restrict power to the laser to prevent or avoid cutting or damaging (e.g., burning) a non-cutting portion of the dental aligner 202, where a non-cutting part of the aligner may be determined by its function or by its material properties. For example, the orientation engine 124 may be configured to adjust at least one of the power, the distance, or the orientation of a layer of the aligner 202 so as to cut one layer of the dental aligner 202 but not cut a second layer of the dental aligner 202 at the same location. In some embodiments, the orientation engine 124 may be configured to change a distance at which the laser cuts a surface of the dental aligner 202. For example, by changing the distance at which the laser cuts a surface, the orientation engine 124 may be configured to provide another angle by which the laser is configured to cut the dental aligner 202.

The laser system 118 may be configured to remove the support structures 204 from the dental aligner 202. For example, the laser of the laser system 118 may be configured to cut the support structures 204 at an interface (e.g., a point and/or area) in which the support structures 204 connect or meet with the dental aligner 202 (e.g., referred to herein as a "joint" shown as connection point 402 in FIG. 4) to remove, or at least substantially remove, the support structures 204 from the dental aligner assembly 200. The joint(s) of the support structures 204 may vary in shape or size. For example, in some embodiments, the joints may have a substantially square, rectangular, or circular, or triangular cross section. In some embodiments, the orientation engine 124 may be configured to receive a digital file of the 3D model of the dental aligner 202 such that the orientation engine 124 may be configured to compare the digital file with the fabricated dental aligner 202. The orientation engine 124 may be configured to identify the support structures 204 to be cut, for example, by parsing or reading the digital file and comparing the digital file with the one or more locatable orientation features of the aligner 202. As another example, the orientation engine 124 may be configured to detect the areas of support structures 204 to be cut by using image recognition or by overlaying the digital file of the 3D model on the fabricated dental aligner 202 to be cut. For example, the orientation engine 124 may be configured to overlay a view of the 3D model (e.g., a top down view, a side view, etc.) with a corresponding view of the fabricated dental aligner 202 such that a shape of the 3D model of the aligner 202 can be aligned with and/or compared with the shape of the fabricated aligner 202. In some embodiments, the orientation engine 124 may be configured to overlay the 3D model of the dental aligner 202 with the fabricated dental aligner 202 by aligning a common point (or common location) in each of the 3D model and the dental aligner 202.

The orientation engine 124 may be configured to orient the dental aligner assembly 200 relative to the laser such that the laser continuously cuts along a portion of the dental aligner assembly 200 to remove the support structures 204. For example, if the dental aligner assembly 200 includes support structures 204 formed with the dental aligner 202 at four distinct joints, the laser system 118 may be configured to orient the dental aligner assembly 200 relative to the laser such that the laser emits a beam that cuts a continuous line (e.g., without any breaks) extending between each of the four joints. As another example, if the dental aligner 202 includes one support structure 204 formed with the dental aligner 202 along a continuous joint (e.g., a joint extending an area along a surface of the dental aligner 202, a joint extending at least a length of one area of the aligner 202 that corresponds to a patient's tooth, a joint extending a length of an area of the aligner 202 that corresponds to a plurality of teeth, a joint extending at least 0.35 mm without any breaks along a surface of the dental aligner 202, etc.), the laser system 118 may be configured to emit a laser beam that cuts a continuous line (e.g., a line along the entire surface of the joint or support) extending along the continuous joint. In some embodiments, the orientation engine 124 may be configured to orient the dental aligner assembly 200 relative to the laser such that the laser cuts the dental aligner assembly 200 along a contour of a base of the dental aligner 202. For example, as described above, the orientation engine 124 may be configured to locate one or more features of the dental aligner 202 (e.g., a marker, a barcode, an image, a QR code, a data matrix, a logo, etc.) and analyze the feature to determine a contour of the dental aligner 202. The orientation engine 124 may be configured to move, rotate, or otherwise orient the dental aligner 202 relative to the laser based on the features such that the laser cuts along the contour of the aligner 202 (e.g., along an exterior of the dental aligner 202 where the joints are formed).

The laser system 118 may be configured to cut the mounting structures from the dental aligner assembly 200. As described above, the fabrication engine 108 may be configured to add the mounting structures to a portion of the support structures 204 of the 3D model (e.g., to a base of the support structures 204). In some embodiments, the orientation engine 124 may be configured to locate the mounting structures by receiving information regarding a location of the mounting structures from the fabrication engine 108 and/or by locating a feature of the mounting structures (e.g., a marking, logo, image, code, etc.). For example, as described above, the orientation engine 124 may be configured to receive a digital file of the 3D model of the dental aligner 202. The orientation engine 124 may be configured to compare the digital file with the fabricated dental aligner 202. The orientation engine 124 may be configured to identify the mounting structures to be cut, for example, by parsing or reading the digital file and comparing the digital file with the one or more locatable orientation features of the aligner 202. As another example, the orientation engine 124 may be configured to detect the areas of mounting structure to be cut by using image recognition or by overlaying the digital file of the 3D model on the fabricated dental aligner 202 to be cut. The orientation engine 124 may be configured to orient the dental aligner assembly 200 relative to the laser such that the laser can cut the mounting structures and remove the mounting structures from the dental aligner 202.

In some embodiments, the laser system 118 may be configured to cut the dental aligner assembly 200 when the dental aligner assembly 200 is still coupled to a portion of the fabrication system 110. For example, as described in greater detail below with reference to FIG. 5A, the fabrication system 110 may include a build surface in which the dental aligner assembly 200 is built on (e.g., formed on, coupled to, etc.). In some embodiments, the laser system 118 may be configured to directly cut the dental aligner assembly 200 from the build surface. For example, in one illustrative embodiment, the dental aligner assembly 200 is formed via SLA. In this embodiment, the dental aligner assemblies 200 attach to the build surface and extend in a downward direction from the build surface. In other words, the dental aligner assemblies 200 hang from the build surface such that, when the dental aligner assemblies 200 are cut from the build surface, the dental aligner assemblies may fall from the build surface by gravity. In these embodiments, the laser system 118 may be configured to at least partially receive the build surface having the one or more dental aligner assemblies 200 and cut, from the build surface, the dental aligner assemblies 200 at a point in which each dental aligner assembly 200 meets the build surface. This is just one illustrative embodiment. As described herein, the dental aligner assemblies 200 can be fabricated via various other additive manufacturing techniques. In some embodiments, the fabrication engine 108 may be configured to prepare 3D models of a dental aligner 202 to be fabricated on a custom build surface (sometimes referred to as a "build plate") that is designed such that the laser system 118 can receive the custom build surface. For example, in some embodiments, the fabrication system 110 may include a build surface that is capable of detaching from the fabrication system 110 such that the laser system 118 can receive the build surface having one or more dental aligner assemblies 200 (e.g., clamp the build surface by a clamping fixture, secure the build surface in a vice, etc.).

In some embodiments, the orientation engine 124 may be configured to determine a sequence of cutting based on the aligners 202 and/or the received build surface 502 having the aligners 202. For example, in the instances where the laser system 118 receives the build surface 502 having the aligners 202, the orientation engine 124 may be configured to identify an edge of the build surface 502 (e.g., using image recognition, using a locatable feature of the build surface 502 and/or of one or more dental aligners 202, etc.). The orientation engine 124 may be configured to identify an edge of the build surface 502 such that the laser removes dental aligners 202 from the build surface 502 starting at an edge and moving inward (e.g., such that aligners 202 positioned along a perimeter of the build surface 502 are removed prior to aligners 202 positioned at a center of the build surface 502). For example, the orientation engine 124 may be configured to use an algorithm to determine an optimal cutting sequence. Determining the cutting sequence may include determining certain portions of the aligner 202 and/or the support structures 204 that offer a minimum structure to support the aligner 202 in a stable position. For example, a sequencing algorithm may determine to first remove the outermost support structures 204 of the fabricated aligner 202 (e.g., those depicted in FIG. 5A) and retain the central support structures 204 (e.g., those depicted in FIG. 3). Similarly, the sequencing algorithm may reverse this order or determine any optimal cutting sequence to provide an optimal cutting sequence. For illustration purposes, an optimal cutting sequence may be determined by the total duration required to perform the support structure 204 removal, the stability of the fabricated aligner 202, the final finish of the aligner 202, the amount of manual labor required, or any other parameter that can be affected by the cutting sequence. The orientation engine 124 may be configured to use the sequencing algorithm to determine the cutting sequence for a single dental aligner assembly 200 and/or for a plurality of dental aligner assemblies 200.

In some embodiments, the laser system 118 may be configured to cut support structures 204 from a dental aligner assembly 200 in parallel with fabricating the dental aligner assemblies 200 via the fabrication system 110. For example, the laser system 118 may be configured to remove support structures 204 from the dental aligner assembly 200 while the dental aligner assembly 200 is being fabricated (e.g., in parallel with printing or simultaneously with printing) such that the support structures 204 are removed as the dental aligner assembly 200 is printed layer-by-layer. According to one exemplary embodiment, the fabrication system 110 includes a system that uses fused filament printing process (e.g., DLP or FDM) in which filament is fed from a spool and is deposited on, for example, a build surface. The laser system 118 may be configured to cut deposited filament forming the support structures 204 from the build surface as the dental aligner assembly 200 forms. In these embodiments, the dental aligner assemblies 200 may not require any additional laser cutting once the fabrication system completes fabricating the dental aligner assemblies 200.

In some embodiments, the laser system 118 may be configured to cut the support structures 204 from the dental aligner assembly 200 based on one or more of the material properties of the aligner 202 and/or the support structures 204. For example, the laser system 118 may be configured to identify a material (e.g., by the orientation engine 124) and/or orient the laser system 118 to cut or not cut the identified material. In other words, the laser system 118 may be configured to cut or not cut predetermined materials of the dental aligner 202 and/or of the support structures 204 (e.g., a first material of a support structure 204 and/or of a layer of the aligner 202 may be cut while a second material of a support structure 204 and/or layer of the aligner 202 may not be cut).

Figure 3:
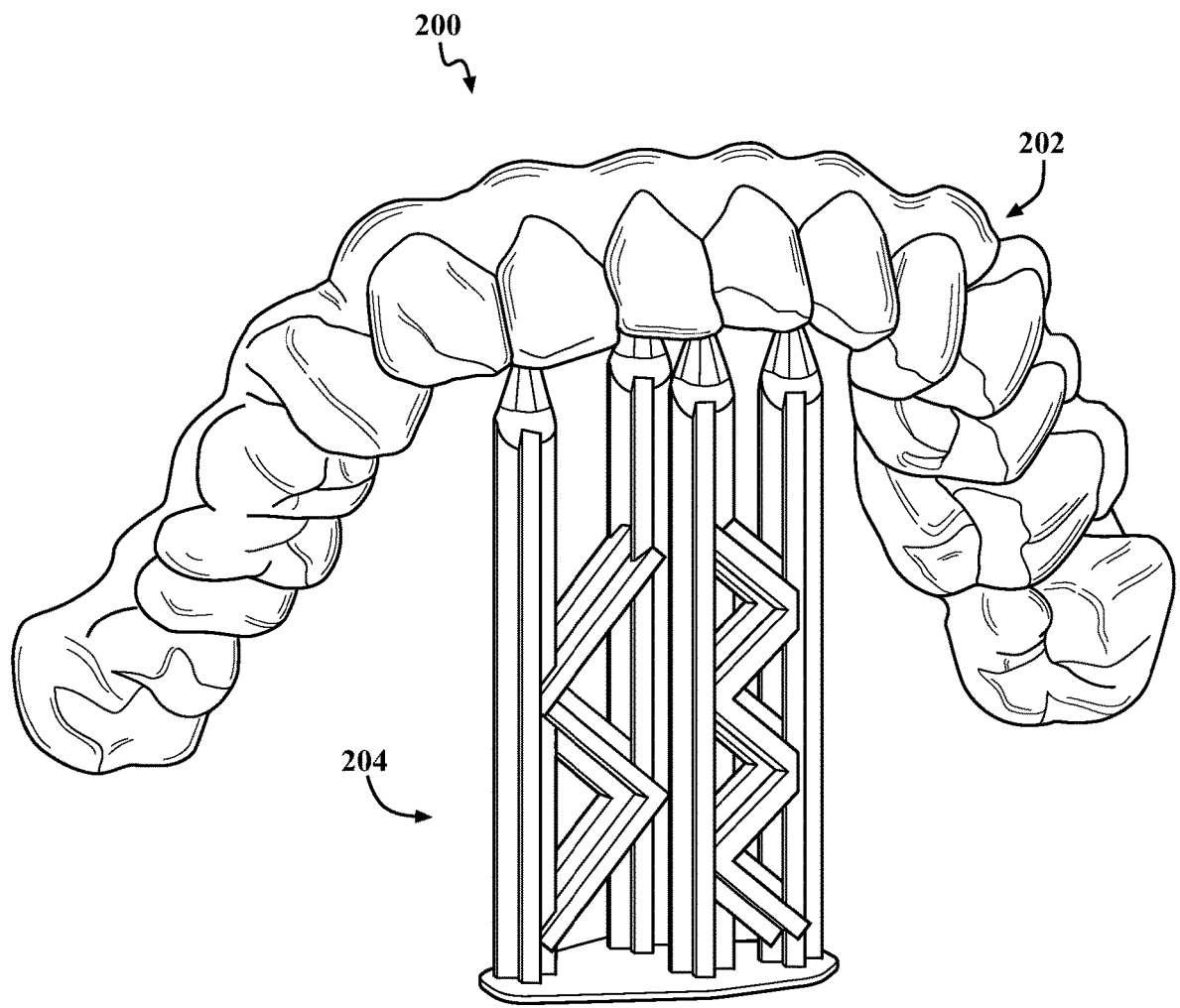
FIG. 3 shows a fabricated orthodontic aligner with support structures, according to an illustrative embodiment.
Figure 4:
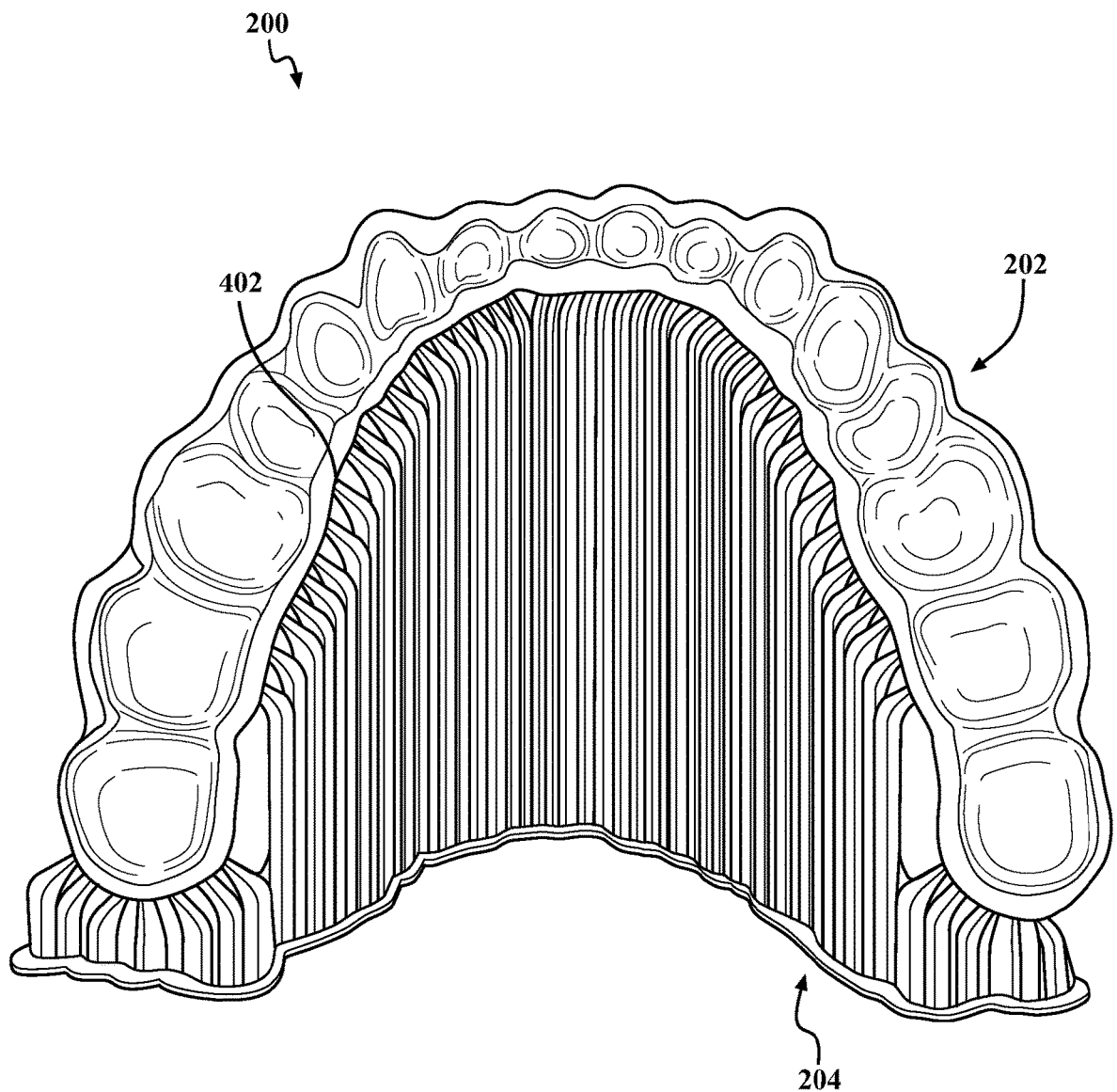
FIG. 4 shows a fabricated orthodontic aligner with support structures, according to an illustrative embodiment.

FIG. 3 shows a front view and FIG. 4 shows a rear view of a fabricated dental aligner assembly 200 with dental aligners 202 and support structures 204, according to illustrative embodiments. Referring to FIG. 3, the support structures 204 can vary in size and/or shape to support the dental aligner 202. For example, in some embodiments, the support structures 204 comprise substantially parallel column-like structures that terminate at a point and/or plurality of points of the dental aligner 202 (e.g., at the joints). In some embodiments, the support structures 204 comprise one or more intersecting portions to provide additional support (e.g., portions of material that extend at an angle relative to one another as shown in FIG. 3). The dental aligner assembly 200 may include one or more support structures 204 that extend from a point along an edge. For example, the support structures 204 may include one or more points positioned along an exterior edge of the dental aligner 202 (e.g., an end portion of the aligner 202 that is closest to an external gingiva line of a patient such as an edge that interfaces with a patient's gums) or along an interior edge (e.g., an edge closest to the patient's tongue) of the dental aligner 202. In some embodiments, the dental aligner assembly 200 may include one or more support structures 204 that extend from a point along a cavity or protrusion of an occlusal surface (e.g., a surface corresponding to a portion of the aligner 202 that interfaces with a patient's tooth) of the dental aligner 202 (e.g., one or more points positioned along a surface of the dental aligner 202 extending between the interior edge and the exterior edge). In some embodiments, joints can vary in thickness. For example, in some embodiments, the joint can include a thickness ranging between 0.1 mm and 0.5 mm (e.g., a length, width, or diameter of an area where the support structures 204 meets or connects to the dental aligner 202). In one illustrative embodiment, the thickness of the joint is about 0.35 mm. In some embodiments, the joint thickness is more than 0.35 mm. For example, in some embodiments, the joint may extend along an edge or surface of the dental aligner 202.

In some embodiments, the thickness of the joint may be about equal to a distance between a first end of a dental aligner 202 (e.g., an end towards the portion that receives front teeth of a patient) to a second end of the dental aligner 202 (e.g., an end towards the portion that receives molar teeth of a patient). For example, the dental aligner assembly 200 may include a continuous line of support structure 204 formed along an edge of the dental aligner 202 (e.g., an exterior edge of the dental aligner 202 closest to the gingiva line of a patient or an interior edge closest to the patient's tongue, a portion of the dental aligner 202 that interfaces with the bottom of a patient's teeth and/or the patient's gums). As another example, the dental aligner assembly 200 may include a continuous line of support structure 204 formed along an occlusal surface or plane of the dental aligner 202 (e.g., an exterior surface opposing an interior surface of the aligner 202 that interfaces with a patient's teeth). In some embodiments, the dental aligner assembly 200 may include one or more support structures 204 positioned along an interior surface of the dental aligner 202 (e.g., along a surface configured to contact or interface a patient's tooth during use). In some embodiments, the support structures 204 positioned on an interior surface of the dental aligner 202 may be configured as a dimple, ridge, or body positioned on the interior surface to provide additional support for the dental aligner 202 (e.g., apply force to one or more teeth of a patient during use).

FIG. 4 shows an example of a dental aligner assembly 200 have a plurality of support structures 204 that extend from one or more points (joints 402) along an interior edge of the dental aligner 202 (e.g., closest to the patient's tongue during use). It should be appreciated that the dental aligner assembly 200 can include any number of support structures 204. For example, the dental aligner assembly 200 can include no support structures 204. As another example, the dental aligner assembly 200 can include 500 support structures 204, or any number of support structures in the ranges of 10 to 500 or 50 to 200, that each extend from a portion of the dental aligner 202. As yet another example, the dental aligner assembly 200 can include one or more continuous support structures 204 (e.g., a joint without any breaks or separation) that extends throughout a portion of the dental aligner 202.

Referring generally to FIGS. 1-4, the fabrication engine 108 may be configured to optimize the 3D model for fabricating the dental aligner 202 by optimizing the shape or size of the one or more support structures 204. For example, the fabrication engine 108 may be configured to determine a shape or size of the support structures 204 based on the green strength of the material of the dental aligner 202 (e.g., the material used during additive manufacturing) or the chemical structure of the material. The fabrication engine 108 may be configured to receive or determine properties of the material in a variety of ways. For example, the fabrication engine 108 may be configured to parse the digital file comprising the 3D model of the dental aligner 202 to extract one or more material properties of the dental aligner 202. In some embodiments, the fabrication engine 108 may be configured to determine one or more material properties of the dental aligner 202 by receiving a user input to the fabrication computing system 102 (e.g., via a user interface, via a keypad input, etc.). In some embodiments, the fabrication engine 108 may be configured to add the support structures 204 to the 3D models based on the received material properties. For example, the fabrication engine 108 may be configured to add a support structure 204 having a continuous shape that supports the aligner 202 based on the material properties (e.g., for a material having low green strength prior to curing). As another example, the fabrication engine 108 may be configured to add a support structure 204 having a specific structure (e.g., a tree-like structure, a "V" shaped structure, "X" shaped structure, column-like structure, etc.), to one or more portions of the dental aligner 202 to preserve the shape of the dental aligner 202 during manufacturing based on the material properties. In some embodiments, the fabrication engine 108 may be configured to optimize the printing angle of the dental aligner 202 based on the material properties, as described in greater detail below.

In some embodiments, the fabrication engine 108 may be configured to add the support structures 204 to a predetermined, predefined, and/or significant portion of the dental aligner 202 (e.g., on the 3D model). For example, the fabrication engine 108 may be configured to add one or more support structures 204 to an edge of the dental aligner 202 (e.g., an end of the aligner 202 that interfaces with a patient's gums). As another example, the fabrication engine 108 may be configured to prepare and/or detect a cavity, an offset surface, or a similar feature of the dental aligner 202 (e.g., a cavity or groove of the dental aligner 202 formed to substantially align with a patient's molar) to add one or more support structures 204 to the feature. For example, the fabrication engine 108 may be configured to add one or more support structures 204 based on a printing production process of the fabrication system 110 and/or based on an accuracy of the fabricated dental aligner 202. As described herein, the fabrication engine 108 may be configured to add one or more support structures 204 based on a finish of the fabricated aligner 202 (e.g., such that the support structures 204 do not interfere with the comfort of the patient). The fabrication engine 108 may be configured to add one or more support structures 204 based on accessibility of the laser system 118 relative to the aligner 202 (e.g., support structures 204 may not be placed in the most concave portions of the dental aligner 202 where the laser cannot access, or support structures 204 may not be placed on portions of the dental aligner 202 having a concavity equal to or greater than a threshold).

In some embodiments, the fabrication engine 108 may be configured to add the support structures 204 to the 3D model of the aligner by modeling one or more joints formed proximate or within the offset surface, cavity, or similar feature. In these embodiments, the laser system 118 may be configured to laser cut the support structures 204 at a location slightly spaced apart from the joint. For example, the laser system 118 may be configured to cut the support structures 204 such that at least a portion of the support structures 204 remains attached to the aligner 202 and flush with a portion of a surface of the aligner 202 (e.g., such that the remaining portion of the support structures 204 attached to, for example, an upper arch of the dental aligner 202 do not contact or interfere with a portion of the corresponding lower arch of the dental aligner 202 during use). In these embodiments, the final fabricated dental aligner 202 may provide various technical improvements over existing systems. For example, by positioning support structures within a cavity or groove of the dental aligner, the dental aligner may require less post-processing (e.g., polishing) than typical aligners 202, as the remaining portions of the support structures 204 are at least partially contained within the cavity or groove. As another example, by positioning support structures along an edge of the dental aligner, the support structures may be easily accessible by the laser.

In some embodiments, the fabrication engine 108 may be configured to prepare the 3D model of the dental aligner 202 by adding one or more extensions to the model. For example, the fabrication engine 108 may be configured to extend a portion of the 3D model of the dental aligner 202 such that the support structures 204 form along the extended portion of the dental aligner 202. In other words, the fabrication engine 108 may be configured to add support structures 204 to the dental aligner 202 at a point which can be removed prior to use by a patient. In these embodiments, the printing engine 116 may be configured to fabricate the aligner 202 having additional material (e.g., added material near the gingiva line, added material near an edge of the aligner 202, added material near an end portion of the aligner 202, added material adjacent to one or more surfaces that conform to a patient's teeth, etc.). The orientation engine 124 may be configured to orient the fabricated dental aligner 202 such that the laser cuts away the extension of the dental aligner 202 having the support structures 204. For example, the laser may be configured to cut a portion of the dental aligner 202 directly to remove the support structures 204 as opposed to cutting one or more joints of the support structures 204 (e.g., cutting along a portion of the dental aligner 202 to form an edge).

Figure 5A:
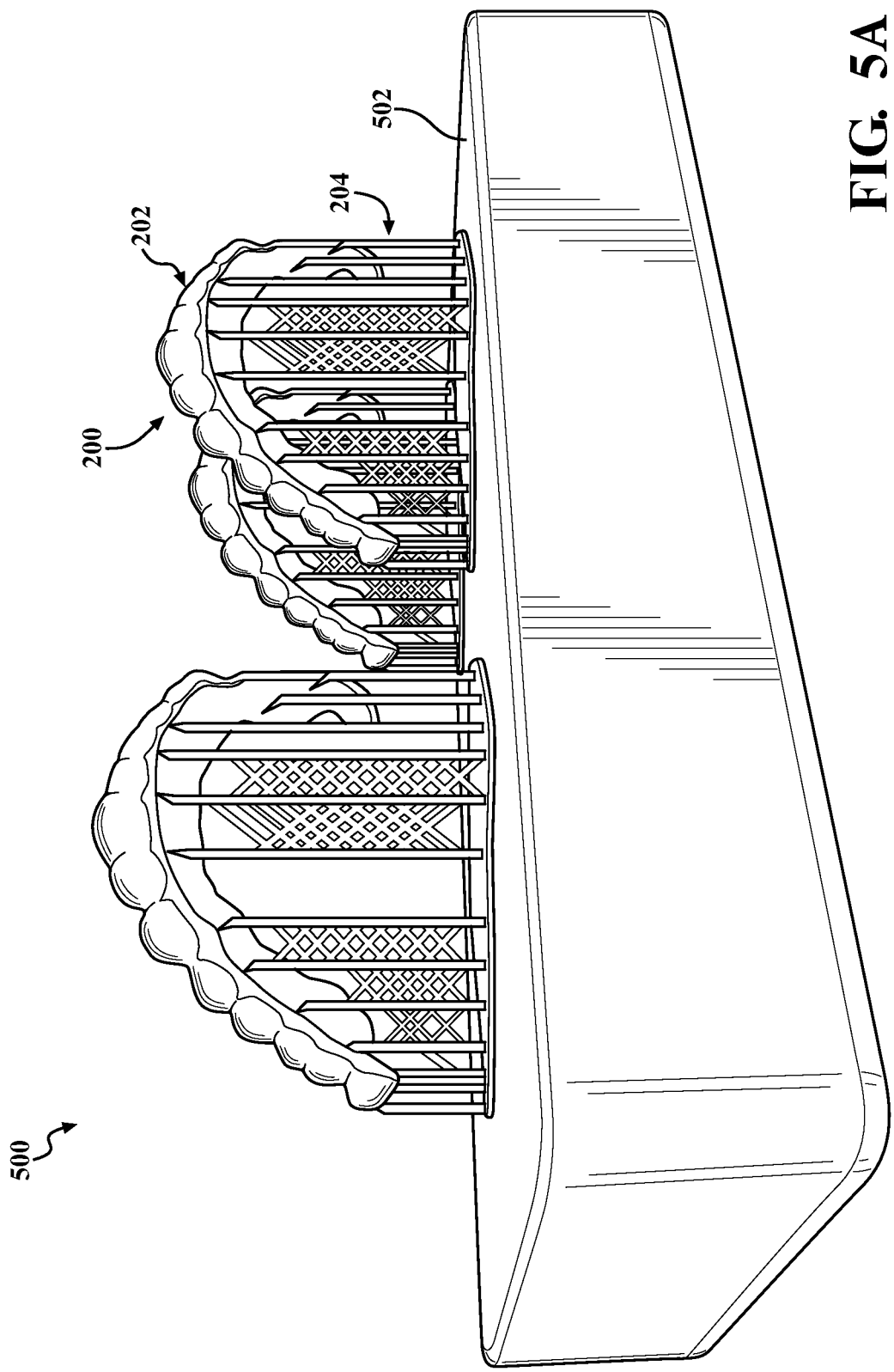
FIG. 5A shows a system for fabricating orthodontic aligners with support structures, according to an illustrative embodiment.

FIG. 5A shows a portion of the fabrication system 110. For example, FIG. 5A shows an example build area 500 of the fabrication system 110 in which a plurality of dental aligner assemblies 200 are manufactured relative to a build surface 502. As described above, the fabrication system 110 can include a variety of additive manufacturing systems. In some embodiments, the fabrication system 110 may be configured to manufacture the one or more dental aligner assemblies 200 layer-by-layer. For example, in some embodiments, the fabrication system 110 may be configured to form each layer starting with a first layer formed on the build surface 502 and forming each additional layer in a direction moving away from the build surface 502. As shown in FIG. 5A, the fabrication system 110 may be configured to fabricate the dental aligner assemblies 200 such that the support structures 204 are closer in distance to the build surface 502 than one or more portions of the dental aligner 202. For example, the fabrication system 110 may be configured to form the support structures 204 prior to forming the dental aligner 202. In some embodiments, the fabrication system 110 may be configured to form one or more support structures 204 while simultaneously forming the dental aligner 202. While the exemplary embodiment shown in FIG. 5A includes three dental aligner assemblies 200 formed on the build surface 502, it should be appreciated that the fabrication system 110 may be configured to manufacture a various amount of dental aligner assemblies 200 depending on the size and shape of the fabrication system 110 or the size and shape of the dental aligner assemblies 200.

Figure 5B:
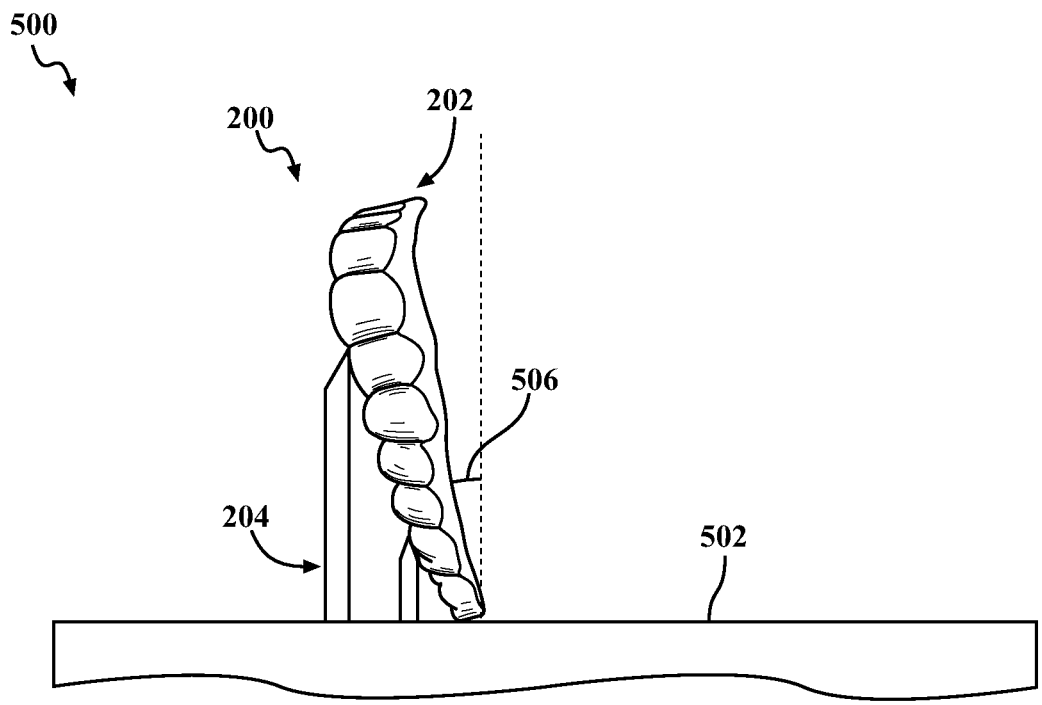
FIGS. 5B-5C show a system for fabricating orthodontic aligners with support structures at various fabrication angles, according to an illustrative embodiment.
Figure 5C:
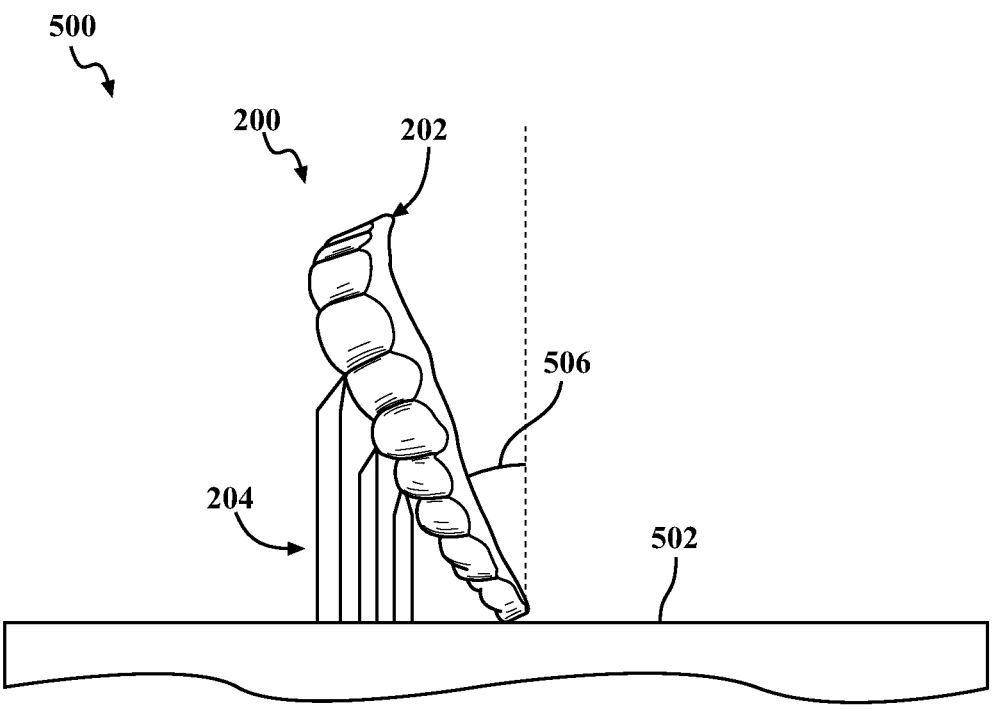

Referring now to FIGS. 5B and 5C, in some embodiments, the fabrication computing system 102, or another computing system communicably coupled to the fabrication system 110, may be configured to optimize the orientation of the dental aligner assemblies 200 to maximize the amount of dental aligner assemblies 200 that can be simultaneously formed while minimizing the amount of support structures 204 required for each dental aligner 202. For example, an angle 506 of orientation of the dental aligners 202 during manufacturing causes a difference in the number of support structures 204 required to properly form the dental aligner 202. As described herein, the angle 506 of orientation is relative to the vertical (e.g., a direction that is perpendicular or normal to the build surface 502, as shown in FIGS. 5B and 5C). The fabrication engine 108 may be configured to analyze the received 3D models of the dental aligners 202 and determine, based on the analysis, an optimized angle 506 of orientation to maximize manufacturing efficiency (e.g., amount of aligners 202 per printing cycle) and minimize number of support structures 204 required for a plurality of dental aligners 202 fabricated based on the one or more 3D models.

The fabrication engine 108 may be configured to analyze the geometry of the 3D model of each dental aligner 202 and the material properties of each aligner 202 (e.g., material density, green strength, etc.) to determine the angle 506 of orientation. For example, FIG. 5B shows an example dental aligner assembly 200 formed layer-by-layer on the build surface 502 at about a degree angle 506. As a 15 degree angle 506, the fabrication engine 108 may be configured to determine that the dental aligner 202 requires a first amount of support structures 204. FIG. 5C shows the example dental aligner assembly 200 formed layer-by-layer on the build surface 502 at about a 20 degree angle 506. At a 20 degree angle, the fabrication engine 108 may be configured to determine that the dental aligner 202 requires a second amount of support structures 204, where the second amount is greater than or equal to the first amount. The fabrication engine 108 may be configured to determine that a first amount of dental aligner assemblies 200 can be formed on the build surface 502 at the 15 degree angle 506 of orientation and that a second amount of dental aligner assemblies 200 can be formed on the same build surface 502 at the 20 degree angle 506 of orientation (e.g., based on a comparison of an area of the build surface 502 with an area of each dental aligner assembly 200), where the first amount is greater than or equal to the second amount. The fabrication engine 108 may be configured to determine that the 15 degree angle 506 of orientation provides an optimized fabrication system 110 in which the dental aligner assemblies 200 require less support structures 204 and/or more dental aligner assemblies 200 can be formed on the same area of the build surface 502. In some embodiments, the fabrication engine 108 may be configured to determine an optimized placement of support structures 204 (e.g., along an occlusal surface, along an edge of the aligner 202, along a convex portion of the aligner 202, or various other portions of the aligner 202) at the optimized angle 506. Responsive to determining the optimized angle 506, the fabrication engine 108 may be configured to transmit a signal to the fabrication system 110 to form each dental aligner assembly 200 at the determined angle 506 of orientation. This example is for illustrative purposes only. It should be appreciated that the angle 506 of orientation can range from 0 degrees to 90 degrees relative to a plane that lies perpendicular to the build surface 502 depending on the size and/or shape of each dental aligner assembly 200.

In some embodiments, the fabrication engine 108 may be configured to determine an angle 506 of orientation of the dental aligner assemblies 200 based on one or more material properties of the dental aligners 202, as mentioned above. For example, the fabrication engine 108 may be configured to determine that a dental aligner 202 fabricated with a material that is substantially rigid or hard can be fabricated at an orientation angle 506 that is smaller than a dental aligner 202 fabricated with a material that is substantially flexible or soft. In some embodiments, the fabrication engine 108 may be configured to determine that one or more dental aligner assemblies 200 can be formed at different angles 506 of orientation to optimize fabrication.

In some embodiments, the fabrication engine 108 may be configured to optimize a plurality of dental aligner assemblies 200 at various angles and/or with various amounts of support structures 204 by comparing one or more printing outcomes. For example, the fabrication engine 108 may be configured to receive instructions (e.g., via a digital file, via a user input, etc.) to fabricate a predetermined amount of aligner assemblies 200 (e.g., 10 assemblies, assemblies, 30 assemblies, etc.). In this instance, the fabrication engine 108 may be configured to compare one or more angles 506 for each aligner assembly 200 to determine a required amount of support structures 204. The fabrication engine 108 may be configured to determine, for example, that each aligner 202 requires 25 supports structures 204 (e.g., 25 joints per aligner 202) at a first angle 506 and 20 support structures 204 at a second angle 506. In this instance, the fabrication engine 108 may be configured to select an angle 506 between the first and second angle based on a dimension of the fabrication system 110, an amount of material available, a time of build, placement of the supports structures 204 (e.g., on an occlusal surface, on an edge of an aligner 202, etc.), or various other factors.

In some embodiments, the fabrication engine 108 may be configured to select between one or more identified printing outcomes. For example, the fabrication engine 108 may be configured to determine, based on one or more 3D models of various aligners 202, a first printing outcome in which the printing engine 116 can print 10 aligners 202 each having 30 support structures 204 at a first angle 506. The fabrication engine 108 may be configured to determine a second printing outcome in which the printing engine 116 can print 8 aligners 202 each having support structures 204 at a second angle 506. In some instances, the first angle 506 is greater than the second angle 506. In some instances, the first angle 506 is less than the second angle 506. The fabrication engine 108 may be configured to output or present each printing outcome via the fabrication computing system 102 (e.g., via a user interface of the fabrication computing system 102) such that a user of the fabricating computing system 202 can select, by an input to the fabrication computing system 102, one of the two printing outcomes. In this instance, the fabrication engine 108 may be configured to transmit one or more control signals to the printing engine 116 to cause the printing engine 116 to fabricate aligner assemblies 200 based on the selected printing outcome responsive to the input.

In some embodiments, the fabrication engine 108 may be configured to receive a plurality of 3D models of dental aligners 202 each corresponding to distinct patients (e.g., a first plurality of 3D models of dental aligners 202 corresponding to a first treatment plan generated for a first patient, a second plurality of 3D models of dental aligners 202 corresponding to a second treatment plan generated for a second patient that is different from the first patient, etc.). The fabrication engine 108 may be configured to determine an optimized printing outcome based on each of the 3D models. For example, the fabrication engine 108 may be configured to determine a maximum amount of dental aligners 202 that can simultaneously be fabricated from a subset of the first plurality of 3D models and a subset of the second plurality of 3D models. In some instances, the fabrication engine 108 may be configured to determine a first aligner 202 corresponding to a first patient's treatment plan can be fabricated with a second aligner 202 corresponding to a second patient's treatment plan, with a third aligner 202 corresponding to a third patient's treatment plan, and so on. In other words, the fabrication engine 108 may be configured to fabricate one or more aligners from various treatment plans simultaneously to optimize an amount of aligners 202 fabricated at once (e.g., a maximum amount), a build time of aligners 202 (e.g., minimize time it takes to fabricate one or more aligners 202), an amount of support structures 204 (e.g., minimize required amount of support structures 204), and/or a placement of the supports structures 204 (e.g., on an occlusal surface, on an edge of an aligner 202, etc.).

By way of example, a first generated treatment plan of a first patient may include 50 aligners 202 for a patient to use throughout a period of time (e.g., 6 months, 8 months, 10 months, etc.). A second generated treatment plan of a second patient may include 20 aligners 202 for a patient to use throughout the same period of time. In some instances, the second generated treatment plan may include aligners 202 that are greater or lesser in size than the first generated treatment plan. In some instances, the second generated treatment plan may include aligners 202 that differ in shape than the aligners 202 of the first treatment plan. The fabrication engine 108 may be configured to optimize printing by causing the fabrication system 110 to fabricate one or more of the aligners 202 of the first treatment plan simultaneously with one or more aligners 202 of the second treatment plan.

For example, the fabrication engine 108 may be configured to mix aligners 202 of a first size with aligners 202 of a second size to optimize the amount of aligners 202 fabricated in one printing cycle of the fabrication system 110. In these embodiments, the fabrication engine 108 may be configured to add one or more locatable features onto the 3D models of the aligners 202 (e.g., a barcode, a QR code, an image, etc.) such that the aligners 202 can be identified and sorted (e.g., by patient) post-fabrication. Manufacturing different aligners together (e.g., simultaneously) may provide various technical improvements over existing systems. For example, by combining one or more distinct aligners (e.g., from distinct treatment plans) into one printing cycle, the systems and methods herein may provide means for manufacturing more aligners at one time as compared to manufacturing only aligners from the same treatment plan. Further, combining one or more distinct aligners may reduce overall build time of the aligners.

In some embodiments, the fabrication engine 108 may be configured to optimize a location of the support structures 204 based on one or more of the orientation angle 506, the angle of laser cutting, or an amount of dental aligners 202 fabricated at once. The fabrication engine 108 may be configured to add one or more support structures 204 to the dental aligner 202 such that the laser system 118 can cut the dental aligner assemblies 200 along a precise line. For example, the cut line can be generated using any of the systems or processes described within U.S. patent application Ser. No. 16/292,779, filed Mar. 5, 2019, and U.S. patent application Ser. No. 17/181,929, filed Feb. 22, 2021, both of which are herein incorporated by reference in their entirety.

Using a 3D model to optimize a build surface 502 of the fabrication system 110 as described may provide various improvements over existing fabrication systems. For example, a typical fabrication system would not generally optimize an orientation angle to permit a maximum number of dental aligners fabricated simultaneously, a minimum number of support structures, and/or an optimized placement of support structures. However, the present solution may model and/or simulate various orientation angles and placements (e.g., attachment positions) of support structures to determine an optimized angle and/or attachment position, as described herein. This improves the functioning of typical systems by providing additional means of reducing fabrication time and/or needed material.

Referring now to FIGS. 6A and 6B, FIG. 6A shows a portion of a 3D model 602 of a dental aligner 202 that has yet to be fabricated, according to an illustrative embodiment. FIG. 6B shows a detailed view of the 3D model 602 of FIG. 6A having a layer 606 illustrating a subset of the plurality of layers that form the fabricated dental aligner 202. As utilized herein "layer" refers to a section of the 3D model 602 lying on a plane that slices or cuts through the 3D model 602. For example, each layer 606 may correspond to the size and location of a layer of the dental aligner 202 that is formed during additive manufacturing. The fabrication engine 108 of the fabrication computing system 102 may be configured to analyze each layer 606 of the 3D model 602 to determine an area 604 of the 3D model 602 that requires one or more support structures 204. For example, the area 604 may define a point or area of the 3D model 602 that represents a corresponding point or area of a fabricated dental aligner 202 that requires a support structure 204 to maintain the shape and/or size of the 3D model 602 during manufacturing (e.g., a point or area in which a portion of the layer 606 extends outward, inward, or otherwise away from another layer 606 such that the point or area requires support, a point that is not connected to another portion of the printed dental aligner 202, etc.). The fabrication engine 108 may be configured to model each layer 606 at the orientation at which each layer 606 would be formed during additive manufacturing. In some embodiments, the fabrication engine 108 may be configured to output or display the 3D model 602 to a graphical user interface of the fabrication computing system 102 such that a technician can scan the 3D model 602 to locate the areas 604. In some embodiments, the fabrication engine 108 may be configured to determine the areas 604 without a technician. For example, the fabrication engine 108 may use various suitable object detection algorithms to automatically detect potential areas 604 in the digital model 602 of the dental aligner 202 that require support structures. In some embodiments, the fabrication engine 108 may be configured to model the 3D model 602 at an angle 506 ranging from 0 degrees to 90 degrees to determine an amount of areas 604 identified at each angle 506. The fabrication engine 108 may be configured to compare each amount of areas 604 at each angle 506 to determine the amount of support structures 204 required. In some examples, the fabrication engine 108 may be configured to analyze the 3D model at each integer ranging between 0 and 90 degrees (e.g., 1 degree, 2 degrees, 3 degrees, etc.). In some embodiments, the fabrication engine 108 may be configured to analyze the 3D model at more precise angles ranging between 0 and 90 degrees (e.g., 1.1 degrees, 1.2 degrees, 1.3 degrees, etc.). In some embodiments, the fabrication engine 108 may be configured to model the aligner 202 within a predetermined range of angles 506 in which support structures 204 may be required (e.g., within 0-65 degrees). It should be understood that the orientation of the aligner 202 in FIGS. 6A and 6B are for illustrative purposes. In some embodiments, the aligners 202 may be oriented 180 degrees relative to the orientation depicted in FIGS. 6A and 6B. In other words, the fabrication engine 108 may be configured to analyze the 3D model at any orientation relative to the build surface 502.

In some embodiments, the fabrication engine 108 may be configured to determine the amount of support structures 204 required at a predetermined angle 506. For example, in some embodiments, the fabrication engine 108 and/or the printing engine 116 may be configured to receive a data packet or user input defining the angle 506 at which the dental aligner assembly 200 is to be formed. In some examples, the fabrication engine 108 may be configured to receive the predetermined angle simultaneously with receiving the 3D model of the dental aligner 202 (e.g., via a digital file). In some examples, the fabrication engine 108 or the printing engine 116 may be configured to receive a user input to the fabrication computing system 102 or the fabrication system 110 that corresponds to an angle 506 of orientation (e.g., via a user interface and/or manual key inputs of the fabrication computing system 102 or the fabrication system 110). In these embodiments, the fabrication engine 108 may be configured to model the 3D model 602 at the predetermined angle 506 to determine the amount of areas 604 that require a support structure 204.

Figure 7A:
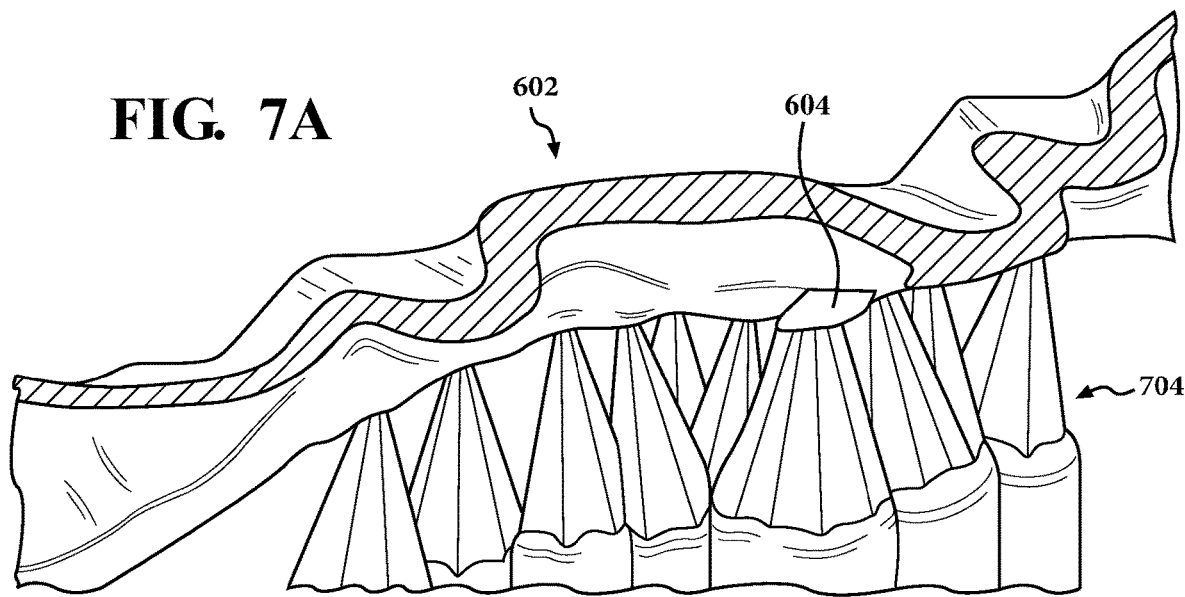
FIGS. 7A-7B show the portion of the 3D model of FIGS. 6A-6B with added support structures, according to an illustrative embodiment
Figure 7B:
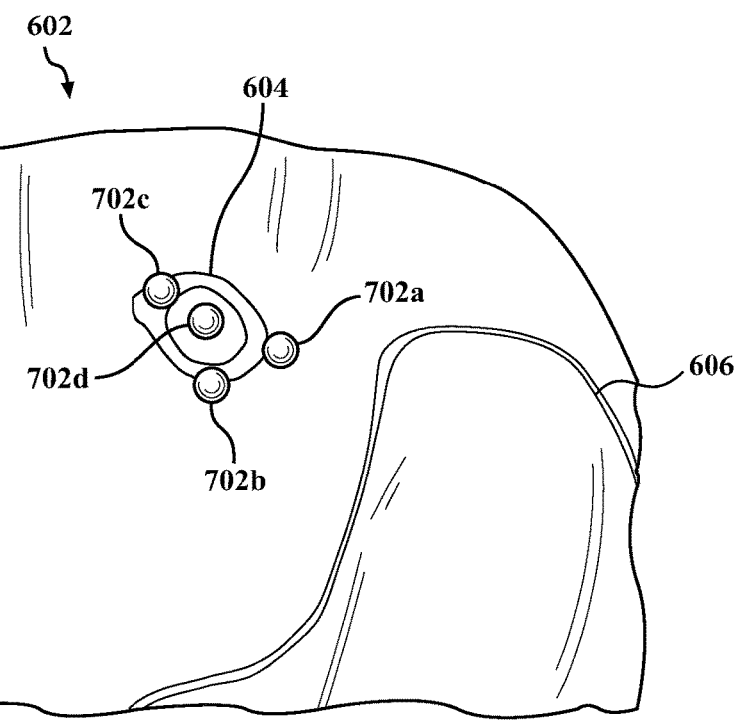

FIG. 7A shows the 3D model 602 having added support structures 704. For example, as described above, the fabrication engine 108 may be configured to add the support structures 704 to the 3D model 602. FIG. 7B shows the 3D model 602 having defined points 702a, 702b, 702c, 702d within the area 604 that require the support structures 704. For example, the fabrication engine 108 may be configured to define the points along the area 604 of the 3D model 602.

Figure 8:
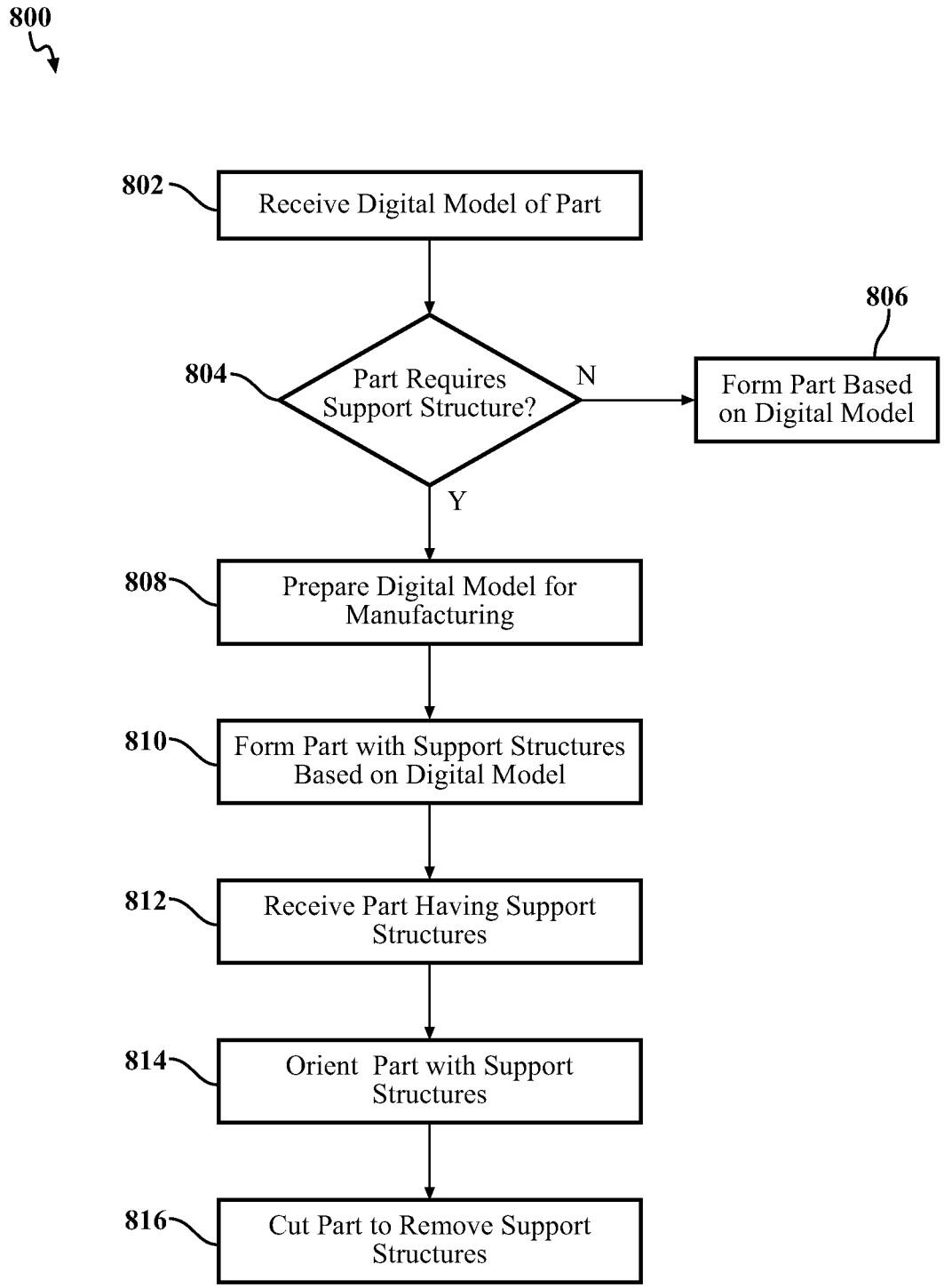
FIG. 8 is a flowchart showing a method for fabricating an orthodontic aligner, according to an illustrative embodiment.

FIG. 8 illustrates a method 800 of fabricating a dental aligner 202, according to an illustrative embodiment. The steps of the method 800 may be performed by one or more components described above with reference to FIG. 1-FIG. 7B.

As an overview, the fabrication engine 108 may receive a digital model of a part, such as a dental aligner 202, at step 802. At step 804, the fabrication engine 108 may determine whether the dental aligner 202 requires one or more support structures 204. Based on this step, the fabrication engine 108 may cause the printing engine 116 to form the dental aligner 202 without support structures 204 based on the digital model at step 806 or the fabrication engine 108 may prepare the digital model for manufacturing by adding one or more support structures 204 to the digital model at step 808. At step 810, the fabrication engine 108 may cause the printing engine 116 to form the dental aligner 202 with the support structures 204 based on the digital model. At step 812, the laser system 118 may receive the dental aligner assembly 200 including the dental aligner 202 and the support structures 204. At step 814, the orientation engine 124 may orient the dental aligner assembly 200. At step 816, the laser of the laser system 118 may cut the dental aligner assembly 200 to remove the support structures 204 from the dental aligner 202.

In greater detail, at step 802, the fabrication computing system 102 may receive one or more digital models of one or more dental aligners via the fabrication engine 108. For example, the fabrication engine 108 can be or can include components that may receive a digital model of a dental aligner 202 corresponding to a generated treatment plan based on a dental dentition or arch of a patient. The fabrication engine 108 may prepare the received digital model of a dental aligner 202 for fabricating the dental aligner. In some embodiments, the fabrication engine 108 may receive the digital model of a dental aligner 202 as a digital file (e.g., an STL file, an OBJ file, or the like). In some embodiments, the fabrication engine 108 may receive one or more inputs to generate the digital model of a dental aligner. For example, the fabrication computing system 102 may receive a user input via a graphical user interface or via a keyboard input to the fabrication computing system 102 to generate a model of a dental aligner 202 (e.g., a digital representation, a 3D image, a point cloud, etc.). In some embodiments, the fabrication engine 108 may receive a digital model of one or more dental aligners from a treatment planning computing system and/or from one or more scanning devices communicably coupled to the fabrication computing system 102.

At step 804, the fabrication engine 108 may determine whether the dental aligner 202 requires one or more support structures 204. As described above, the fabrication engine 108 may analyze the received 3D model of the dental aligner 202 at various manufacturing orientation angles 506. In some embodiments, the fabrication engine 108, or the printing engine 116, may receive a predetermined angle 506 value from the digital file having the 3D model. In some embodiments, the fabrication engine 108, or the printing engine 116, may receive a predetermined angle 506 via a user input to the fabrication computing system 102 or the fabrication system 110. For example, the fabrication computing system 102 or the fabrication system 110 may receive a user input to a graphical user interface or via one or more keypad inputs defining an orientation angle 506. The fabrication engine 108 may model the dental aligner 202 for manufacturing at the defined angle 506. The fabrication engine 108 may detect, layer-by-layer, points or areas 604 of the dental aligner 202 that require one or more support structures 204. For example, the points or areas 604 may include any area of the dental aligner 202 that does not contact another portion of the dental aligner 202 directly above or below the dental aligner 202 during manufacturing at the defined angle 506 (e.g., an overhang, a bridge, a convex or concave portion, an asymmetrical portion, etc.). The fabrication engine 108 may determine, based on the identified areas 604, an amount (e.g., area of a joint, amount of joints, etc.) of support structures 204 required to support the identified area 604.

In some embodiments, the fabrication engine 108 may analyze the 3D model iteratively throughout a range of orientation angles 506 (e.g., between 0 and 90 degrees) to determine an amount of support structures 204 required at each angle. In some examples, the fabrication engine 108 may analyze the 3D model at each integer ranging between 0 and 90 degrees (e.g., 1 degree, 2 degrees, 3 degrees, etc.). In some embodiments, the fabrication engine 108 may analyze the 3D model at more precise angles ranging between 0 and 90 degrees (e.g., 1.1 degrees, 1.2 degrees, 1.3 degrees, etc.). In some embodiments, the fabrication engine 108 may optimize the aligner 202 at various orientations such that the support structures 204 are added only to, or predominately added to, an occlusal surface of the aligner 202 or to an edge of the aligner 202 (e.g., a bottom or top edge area of the aligner that interfaces with a patient's gums). The fabrication engine 108 may determine a number of required support structures 204 at each modeled angle 506. The fabrication engine 108 may compare each number at each angle 506 to determine a minimum number of support structures 204. In some embodiments, the fabrication engine 108 may define the fabrication angle 506 based on the identified angle 506 that requires the least amount of support structures 204. In some embodiments, the fabrication engine 108 may define the fabrication angle 506 based on the identified angle 506 that requires the most amount of support structures 204, as another example. In some embodiments, the fabrication engine 108 may model the aligner 202 within a predetermined range of angles 506 in which support structures 204 may be required (e.g., within 0-65 degrees).

In some embodiments, the fabrication engine 108 may determine that no support structures 204 are required to support the dental aligner 202 during manufacturing at a specified angle 506. For example, the fabrication engine 108 may determine that no support structures 204 are required at an angle 506 of 0 degrees (e.g., when the aligners 202 are parallel with the build surface 502). Responsive to determining the no support structures 204 are required, the fabrication engine 108 may transmit an activation signal or message to the printing engine 116 of the fabrication system 110 to cause the fabrication system 110 to fabricate the dental aligner 202 at step 806. In some embodiments, the fabrication engine 108 may transmit data corresponding to the digital model to the printing engine 116 such that the printing engine 116 may fabricate the aligner 202 based on the digital model (e.g., the digital file, a data packet having one or more coordinates of the digital model, etc.).

In some embodiments, the fabrication engine 108 may determine that one or more support structures 204 are required. Responsive to determining that one or more support structures 204 are required, the fabrication engine 108 may proceed to step 808 where the fabrication engine 108 may prepare the digital model for manufacturing. In some embodiments, the fabrication engine 108 may prepare the digital model for manufacturing by adding one or more support structures 204 to the digital model. For example, the fabrication engine 108 may add the required support structures 204 to the 3D model at the identified points and/or areas determined in step 804. As described in greater detail above, in some embodiments, the fabrication engine 108 may add support structures 204 to the 3D model along a predetermined portion of the dental aligner 202 (e.g., on an occlusal surface or an edge of the aligner 202). In some embodiments, the fabrication engine 108 may prepare the 3D model of the dental aligner 202 by adding one or more mounting structures and/or materials to the 3D model. For example, as described in greater detail above, the fabrication engine 108 may add one or more mounting apertures, protrusions, surfaces, supports, or other alignment features to the 3D model of the dental aligner 202 (e.g., to the support structures 204) such that one or more portions of the laser system 118 can receive the manufactured dental aligner 202 via the mounting structures. Once prepared, the fabrication engine 108 may transmit the prepared 3D model to the fabrication system 110.

At step 810, the fabrication engine 108 may cause the printing engine 116 to form the dental aligner 202 with the support structures 204 based on the digital model. In some embodiments, the printing engine 116 may fabricate the dental aligner assembly 200 having the dental aligner 202 and the support structures 204 formed with the dental aligner 202 automatically in response to receiving the transmitted 3D model. In some embodiments, the printing engine 116 may fabricate the dental aligner assembly 200 in response to receiving a user input to the fabrication computing system 102 (e.g., via a graphical user interface or keypad input) or in response to receiving a user input to the fabrication system 110 (e.g., via a keypad input). As described above, the fabrication system 110 may be or may include various additive manufacturing fabrication systems to form the dental aligner assembly 200. For example, the dental aligner assembly 200 may be formed via vat polymerization (e.g., digital light processing ("DLP"), continuous liquid interface production, stereolithography ("SLA") 3D printing), powder bed fusion (e.g., selective laser sintering), binder jetting, material jetting, and/or material extrusion (e.g., fused deposition modeling). In some embodiments, the fabricated dental aligner assembly 200 may be moved from the fabrication system 110 to the laser system 118 (e.g., by a technician). In some embodiments, fabrication system 110 may include a removable portion (e.g., a removable build plate) that decouples from the fabrication system 110 such that the build plate, having the dental aligner assembly 200 coupled to the build plate, can be moved to the laser system 118.

In some embodiments, the system 100 may include one or more components to treat the dental aligner assembly 200 post-manufacturing. For example, the system 100 may include one or more curing systems (e.g., an ultraviolet ("UV") curing system) to cure the dental aligner assembly 200 after the fabrication of the dental aligner assembly 200. The curing system may cure the dental aligner assembly 200 for various amounts of time. For example, the curing system may cure the dental aligner assembly 200 for 1 minute. The curing system may cure the dental aligner assembly 200 for 60 minutes or more, as another example. The curing system may cure the dental aligner 202 for various amounts of time depending on the properties of the curing system. According to one embodiment, the curing system may cure the dental aligner assembly 200 for any amount of time in the range of 1 to 60 minutes (e.g., about 20 to 30 minutes). In some embodiments, the system 100 may include one or more additional post-processing systems including, but not limited to, a cleaning system (e.g., a washing area to clean the dental aligner assembly 200 using one or more solvents such as isopropyl alcohol ("IPA"), tripropylene glycol monomethyl ether ("TPM"), or the like), a spinning system, a sandblasting system, and/or a tumbling system (e.g., a system that vibrates the dental aligner assembly 200 with or without abrasive or polishing particles) to finalize the dental aligner assembly 200 for use by a patient (e.g., harden the material of the dental aligner 202).

At step 812, the laser system 118 may receive the dental aligner assembly 200 including the dental aligner 202 and the support structures 204. In some embodiments, the laser system 118 may receive the dental aligner assembly 200 by the mounting structures formed with the dental aligner assembly 200. For example, the laser system 118 may include one or more fixtures (e.g., vices, clamps, surfaces, or the like) that fix the dental aligner assembly 200 (or the build plate) to the laser system 118. In some embodiments, the fixtures that receive the dental aligner assembly 200 may rotatably fix the dental aligner assembly 200 to the laser system 118. In some embodiments, the laser system 118 may receive a single dental aligner assembly 200 at a time. In some embodiments, the laser system 118 may receive a plurality of dental aligner assemblies 200 at the same time.

At step 814, the orientation engine 124 may orient the dental aligner assembly 200. As described above, the orientation engine 124 can be or can include any device(s), component(s), circuit(s), or other combination of hardware components designed or implemented to orient or locate certain features of a received fabricated dental aligner. In some embodiments, the orientation engine 124 may locate a fiducial marker, an image, a signature, a logo, a barcode, a QR code, a data matrix, an RFID tag, or a similar feature located on a portion of the dental aligner assembly 200 (e.g., on at least one of the dental aligner 202 or the support structures 204). In some embodiments, the orientation engine 124 may include an optical reader, scanner, or the like to locate the orientation feature. In some embodiments, the orientation engine 124 may communicably couple to one or more components of the laser system 118, such as one or more fixtures that receive the dental aligner assembly 200, such that the orientation engine 124 may transmit data from the reader and/or scanner to the one or more fixtures that receive the dental aligner assembly 200.

The orientation engine 124 may cause one or more portions of the laser system 118 to orient (e.g., move, rotate, etc.) the aligner assembly relative to another portion of the laser system 118. In some embodiments, the orientation engine 124 may orient the dental aligner assembly 200 relative to a laser of the laser system 118. For example, in some embodiments, the orientation engine 124 may align a portion of the orientation feature with a pathway of the laser of the laser system 118. In some embodiments, the orientation engine 124 may align the orientation feature with another portion of the laser system 118 such that the pathway of the laser is at an angle to the orientation feature.

At step 816, the laser of the laser system 118 may cut the dental aligner assembly 200 to remove the support structures 204 from the dental aligner 202. For example, the laser of the laser system 118 may cut the support structures 204 at a point and/or area in which the support structures 204 connect with the dental aligner 202 to remove, or at least substantially remove, the support structures 204 from the dental aligner assembly 200. The orientation engine 124 may orient the dental aligner assembly 200 relative to the laser such that the laser continuously cuts along a portion of the dental aligner assembly 200 to remove the support structures 204. For example, if the dental aligner assembly 200 includes support structures 204 formed with the dental aligner 202 at four distinct joints, the laser system 118 may orient the dental aligner assembly 200 relative to the laser such that the laser emits a beam that cuts a continuous line extending between each of the four joints. As another example, if the dental aligner 202 includes one support structure 204 formed with the dental aligner 202 along a continuous joint, the laser system 118 may emit a laser beam that cuts a continuous line extending along the continuous joint.

In some embodiments, the orientation engine 124 may orient the dental aligner assembly 200 relative to the laser such that the laser cuts the dental aligner assembly 200 along a contour of a base of the dental aligner 202. For example, the orientation engine 124 may locate one or more features of the dental aligner 202 (e.g., a marker, a barcode, an image, a QR code, a data matrix, a logo, etc.) and analyze the features to determine a contour of the dental aligner 202. The orientation engine 124 may move, rotate, or otherwise orient the dental aligner 202 relative to the laser based on the features such that the laser cuts along the contour of the aligner 202. As another example, the orientation engine 124, or another component of the laser system 118, may receive one or more data packets from another component of the system 100 (e.g., via the fabrication engine 108), where the data packets include 3D data regarding the 3D model of the dental aligner. The orientation engine 124 may detect, extract, or otherwise determine a contour of the fabricated aligner 202 based on the data of the 3D model corresponding to the fabrication aligner 202. The orientation engine 124 may move, rotate, or otherwise orient the dental aligner 202 relative to the laser based on the received data packet such that the laser cuts along the contour of the aligner 202.

In some embodiments, the orientation engine 124 may receive a digital file of the 3D model of the dental aligner 202. The orientation engine 124 may compare the digital file with the fabricated dental aligner 202. The orientation engine 124 may identify the support structure 204 to be cut, for example, by parsing or reading the digital file and comparing the digital file with the one or more locatable orientation features of the aligner 202. As another example, the orientation engine 124 may detect the areas of support structures 204 to be cut by using image recognition or by overlaying the digital file of the 3D model on the fabricated dental aligner 202 to be cut. For example, the orientation engine 124 may overlay a view of the 3D model (e.g., a top down view, a side view, etc.) with a corresponding view of the fabricated dental aligner 202 such that a shape of the 3D model of the aligner 202 can be aligned with and/or compared with the fabricated aligner 202. In some embodiments, the orientation engine 124 may overlay the 3D model of the dental aligner 202 with the fabricated dental aligner 202 by aligning a common point (or common location) in each of the 3D model and the dental aligner 202. In some embodiments, the system 100 may not cut the support structures 204 from the dental aligner 202. For example, in some embodiments, the method 800 may proceed without steps 812-816.

The laser system 118 may cut the mounting structures from the dental aligner assembly 200. In some embodiments, the orientation engine 124 may locate the mounting structures by receiving information regarding a location of the mounting structures from the fabrication engine 108 or by locating a feature of the mounting structures (e.g., a marking, logo, image, code, etc.). The orientation engine 124 may orient the dental aligner assembly 200 relative to the laser such that the laser can cut the mounting structures and decouple the mounting structures from the dental aligner 202.

In some embodiments, the orientation engine 124 may determine a sequence of cutting based on the aligners 202 and/or the received build surface 502 having the aligners 202. For example, in the instances where the laser system 118 receives the build surface 502 having the aligners 202, the orientation engine 124 may identify an edge of the build surface 502 (e.g., using image recognition, using a locatable feature of the build surface 502 and/or of one or more dental aligners 202, etc.). The orientation engine 124 may identify an edge of the build surface 502 such that the laser removes dental aligners 202 from the build surface 502 starting at an edge and moving inward (e.g., such that aligners 202 positioned along a perimeter of the build surface 502 are removed prior to aligners 202 positioned at a center of the build surface 502).

In some embodiments, the system 100 may include one or more components to prepare the cut dental aligner 202 for use by a patient. For example, the system 100 may include one or more polishing components or buffing components (e.g., buffing wheel, painting system, glazing system, etc.) to polish any portion of the dental aligner 202 in which a support structures 204 were formed. For example, the polishing components may polish the dental aligner 202 to remove or reduce any jagged edges, sharp points, uneven surfaces, or similar features that formed due to laser cutting the support structures 204 from the dental aligner 202.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As utilized herein, terms of degree such as "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to any precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that terms such as "exemplary," "example," and similar terms, as used herein to describe various embodiments, are intended to indicate that such embodiments are possible examples, representations, or illustrations of possible embodiments, and such terms are not intended to connote that such embodiments are necessarily extraordinary or superlative examples.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any element on its own or any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the drawings. It should be noted that the orientation of various elements may differ according to other exemplary embodiments, and that such variations are intended to be encompassed by the present disclosure.

As used herein, terms such as "engine" or "circuit" may include hardware and machine-readable media storing instructions thereon for configuring the hardware to execute the functions described herein. The engine or circuit may be embodied as one or more circuitry components including, but not limited to, processing circuitry, network interfaces, peripheral devices, input devices, output devices, sensors, etc. In some embodiments, the engine or circuit may take the form of one or more analog circuits, electronic circuits (e.g., integrated circuits (IC), discrete circuits, system on a chip (SOCs) circuits, etc.), telecommunication circuits, hybrid circuits, and any other type of circuit. In this regard, the engine or circuit may include any type of component for accomplishing or facilitating achievement of the operations described herein. For example, an engine or circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

An engine or circuit may be embodied as one or more processing circuits comprising one or more processors communicatively coupled to one or more memory or memory devices. In this regard, the one or more processors may execute instructions stored in the memory or may execute instructions otherwise accessible to the one or more processors. The one or more processors may be constructed in a manner sufficient to perform at least the operations described herein. In some embodiments, the one or more processors may be shared by multiple engines or circuits (e.g., engine A and engine B, or circuit A and circuit B, may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more suitable processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given engine or circuit or components thereof may be disposed locally (e.g., as part of a local server, a local computing system, etc.) or remotely (e.g., as part of a remote server such as a cloud based server). To that end, engines or circuits as described herein may include components that are distributed across one or more locations.

An example system for providing the overall system or portions of the embodiments described herein might include one or more computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

Although the drawings may show and the description may describe a specific order and composition of method steps, the order of such steps may differ from what is depicted and described. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions, and arrangement of the embodiments without departing from the scope of the present disclosure as expressed in the appended claims.

What is claimed is:

1. A method comprising:
    receiving, by a computing system, a first digital model of a first dental aligner configured to move one or more teeth based on a generated treatment plan;
    receiving, by the computing system, a second digital model of a second dental aligner configured to move one or more teeth based on a second generated treatment plan;
    preparing, by the computing system, the first digital model of the first dental aligner for manufacturing, wherein preparing the first digital model of the first dental aligner includes modifying the first digital model by adding one or more support structures to the first digital model to be formed with the first dental aligner;
    preparing, by the computing system, the second digital model of the second dental aligner for manufacturing, wherein preparing the second digital model of the second dental aligner includes analyzing a size or shape of the second digital model of the second dental aligner and a size or shape of the first digital model of the first dental aligner;
    forming, via additive manufacturing, the first dental aligner with the one or more support structures based on the modified first digital model;
    forming, via additive manufacturing, the second dental aligner simultaneously with the first dental aligner;
    receiving, by a laser system, the first dental aligner with the one or more support structures;
    orienting, by the laser system, the first dental aligner with the one or more support structures relative to the laser system, wherein orienting the first dental aligner includes locating one or more features of the first dental aligner relative to the laser system; and
    cutting, by the laser system, an interface between the support structures and the first dental aligner to remove the one or more support structures from the first dental aligner.

2. The method of claim 1, wherein:
    the one or more support structures includes a continuous support that extends a length along a portion of a surface of the first dental aligner;
    the length is greater than 0.35 millimeters; and cutting the interface includes making a continuous cut along the length of the continuous support.

3. The method of claim 1, wherein forming the first dental aligner includes:
fabricating, by a fabrication system, the first dental aligner layer-by-layer at an angle relative to a normal of a surface; and
wherein the angle is in a range of 5 degrees to 45 degrees relative to the normal of the surface.

4. The method of claim 3, wherein adding the one or more support structures to the first digital model to be formed with the first dental aligner is based on the angle of the first dental aligner relative to the normal.

5. The method of claim 3, wherein modifying the first digital model by adding the one or more support structures to the first digital model to be formed with the first dental aligner includes:
determining, by the computing system, an attachment position of the one or more support structures relative to the first dental aligner based on the angle; and
wherein the attachment position includes at least one of an occlusal surface or an edge of the first dental aligner.

6. The method of claim 1, wherein:
the one or more features of the first dental aligner includes at least one of a fiducial, a data matrix, or a readable indicium; and
the one or more features are positioned on at least one support structure of the first dental aligner.

7. The method of claim 1, wherein:
the one or more support structures includes a plurality of support structures;
a first support structure of the plurality of support structures is positioned along an edge of the first dental aligner and a second support structure of the plurality of support structures is positioned towards a center of the first dental aligner; and
cutting the interface includes cutting the first support structure prior to cutting the second support structure.

8. A system comprising:
a fabrication computing system having one or more processors and memory storing instructions that, when executed by the one or more processors, cause the one or more processors to:
receive a first digital model of a first dental aligner configured to move one or more teeth based on a generated treatment plan;
receive a second digital model of a second dental aligner configured to move one or more teeth based on a second generated treatment plan;
prepare the first digital model of the first dental aligner for manufacturing, wherein preparing the first digital model of the first dental aligner includes modifying the first digital model by adding one or more support structures to the first digital model to be formed with the first dental aligner; and
prepare the second digital model of the second dental aligner for manufacturing, wherein preparing the second digital model of the second dental aligner includes analyzing a size or shape of the second digital model of the second dental aligner and a size or shape of the first digital model of the first dental aligner;
a 3D printing fabrication system configured to print the first dental aligner with the one or more support structures and the second dental aligner simultaneously; and
a laser system having one or more processors and memory storing instructions that, when executed by the one or more processors, cause the one or more processors to:
orient, by a fixture, the first dental aligner with the one or more support structures, wherein orienting the first dental aligner includes locating one or more features of the first dental aligner relative to the laser system; and
cut, by a laser beam, an interface between the support structures and the first dental aligner to remove the one or more support structures from the first dental aligner.

9. The system of claim 8, wherein:
the one or more support structures includes a continuous support that extends a length along a portion of a surface of the first dental aligner;
the length is greater than 0.35 millimeters; and
cutting the interface includes making a continuous cut along the length of the continuous support.

10. The system of claim 8, wherein printing the first dental aligner includes:
printing, by the 3D printing fabrication system, the first dental aligner layer-by-layer at an angle relative to normal of a surface; and
wherein the angle is in a range of 5 degrees to 45 degrees relative to the normal of the surface.

11. The system of claim 10, wherein adding the one or more support structures to the first digital model to be formed with the first dental aligner is based on at least one of the angle of the first dental aligner relative to the normal or a position of the one or more support structures relative to the first dental aligner.

12. The system of claim 8, wherein:
the one or more features of the first dental aligner includes at least one of a fiducial, a data matrix, or a readable indicium; and
the one or more features are positioned on at least one support structure of the first dental aligner.

13. The system of claim 10, wherein the one or more support structures are coupled to at least one of an occlusal surface of the first dental aligner or an edge of the first dental aligner.

14. A system, comprising:
a fabrication computing system having one or more processors and memory storing instructions that, when executed by the one or more processors, cause the one or more processors to:
receive a first digital model of a first dental aligner configured to move one or more teeth based on a generated treatment plan;
receive a second digital model of a second dental aligner configured to move one or more teeth based on a second generated treatment plan;
prepare the first digital model of the first dental aligner for manufacturing, wherein preparing the first digital model of the first dental aligner includes modifying the first digital model by adding one or more support structures to the first digital model to be formed with the first dental aligner; and
prepare the second digital model of the second dental aligner for manufacturing, wherein preparing the second digital model of the second dental aligner includes analyzing a size or shape of the second digital model of the second dental aligner and a size or shape of the first digital model of the first dental aligner; and a 3D printing fabrication system configured to print the first dental aligner with the one or more support structures and the second dental aligner simultaneously.

15. The system of claim 14, wherein:
the one or more support structures includes a continuous support that extends a length along a portion of a surface of the first dental aligner; and
the length is greater than 0.35 millimeters.

16. The system of claim 14, wherein printing the first dental aligner includes:
printing, by the 3D printing fabrication system, the first dental aligner layer-by-layer at an angle relative to normal of a surface; and
wherein the angle is in a range of 5 degrees to 45 degrees relative to the normal of the surface.

17. The system of claim 16, wherein adding the one or more support structures to the first digital model to be formed with the first dental aligner is based on the angle of the first dental aligner relative to the normal.

18. The system of claim 16, wherein modifying the first digital model by adding the one or more support structures to the first digital model to be formed with the first dental aligner includes:
determining an attachment position of the one or more support structures relative to the first dental aligner based on the angle; and
wherein the attachment position includes at least one of an occlusal surface or an edge of the first dental aligner.

19. The system of claim 14, wherein:
the one or more support structures includes a plurality of support structures; and
a first support structure of the plurality of support structures is positioned along an edge of the first dental aligner and a second support structure of the plurality of support structures is positioned towards a center of the first dental aligner.

20. The system of claim 14, wherein the one or more support structures are configured to be removed by a laser.

* * * * *